(12) United States Patent
Oba

(10) Patent No.: US 9,262,102 B2
(45) Date of Patent: Feb. 16, 2016

(54) IMAGE FORMING SYSTEMS, AND METHODS OF USING SAME

(71) Applicant: CANON KABUSHIKI KAISHA, Tokyo (JP)

(72) Inventor: Yoshitaka Oba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/553,951

(22) Filed: Nov. 25, 2014

(65) Prior Publication Data

US 2015/0153972 A1    Jun. 4, 2015

(30) Foreign Application Priority Data

Nov. 29, 2013   (JP) .................................. 2013-246933

(51) Int. Cl.
*G06F 3/12*    (2006.01)

(52) U.S. Cl.
CPC ............ *G06F 3/1221* (2013.01); *G06F 3/1229* (2013.01); *G06F 3/1232* (2013.01); *G06F 3/1285* (2013.01)

(58) Field of Classification Search
USPC ........................................................ 358/1.14
See application file for complete search history.

(56) References Cited

U.S. PATENT DOCUMENTS

| 2007/0048051 | A1* | 3/2007 | Nakajima et al. | 399/382 |
| 2008/0018930 | A1* | 1/2008 | Koike | 358/1.15 |
| 2014/0368862 | A1* | 12/2014 | Ooba | 358/1.14 |

FOREIGN PATENT DOCUMENTS

| JP | 2007-223275 A | 9/2007 |
| JP | 2010-002500 A | 1/2010 |

* cited by examiner

*Primary Examiner* — Ngon Nguyen
(74) *Attorney, Agent, or Firm* — Canon USA, Inc. IP Division

(57) ABSTRACT

At least one image processing apparatus includes a storage unit configured to store configuration information of an image forming apparatus, a return unit configured to return the image processing apparatus from a power saving state when the image processing apparatus detects a predetermined condition, and a request unit configured to transmit a request for acquiring the configuration information of the image forming apparatus to the image forming apparatus when the return unit returns the image processing apparatus from the power saving state. The image forming apparatus includes a transmission unit configured to transmit the configuration information of the image forming apparatus to the image processing apparatus based on the request transmitted by the request unit. Further, the image processing apparatus includes an update unit configured to update the configuration information stored in the storage unit by using the configuration information of the image forming apparatus transmitted by the transmission unit.

20 Claims, 16 Drawing Sheets

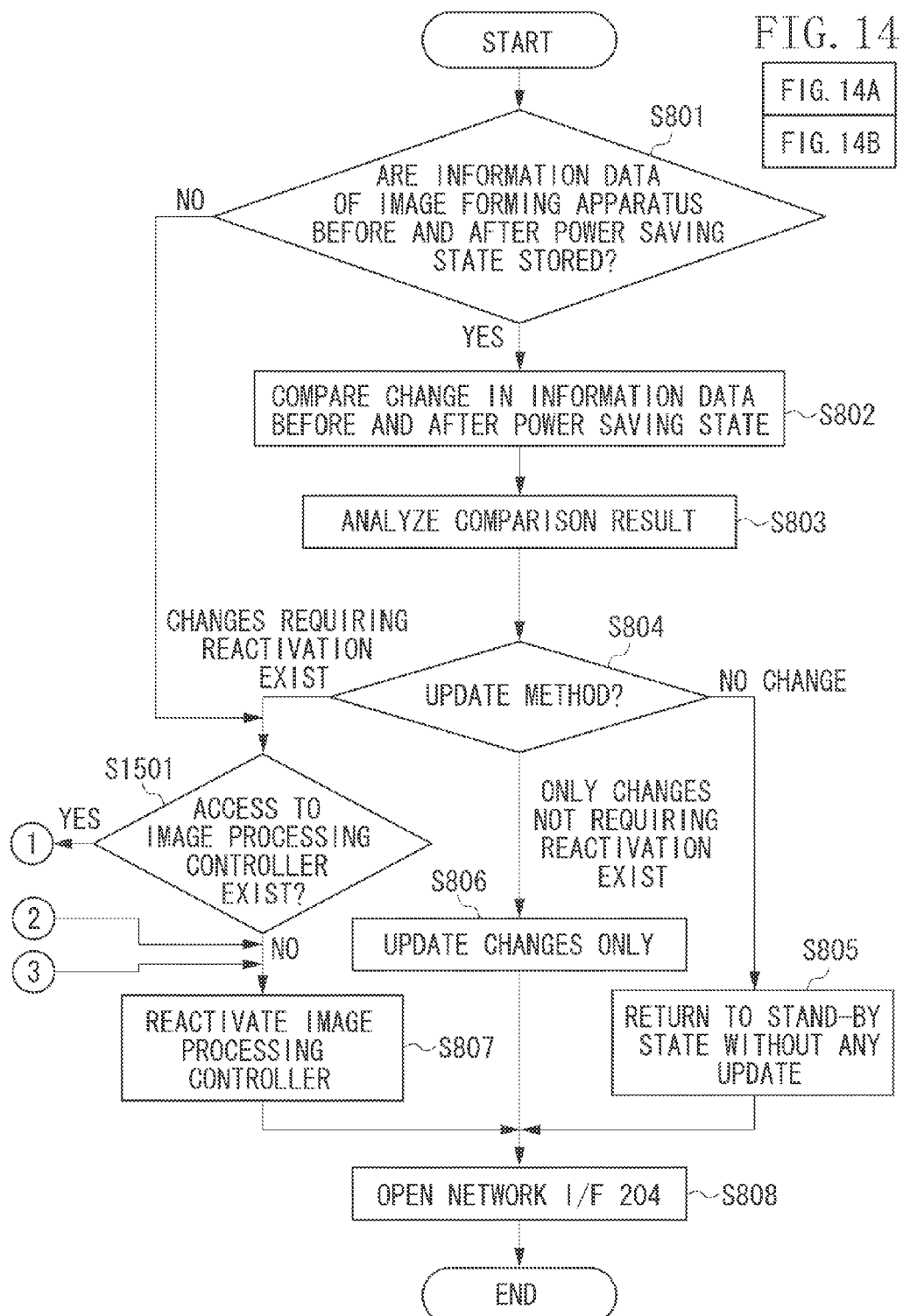

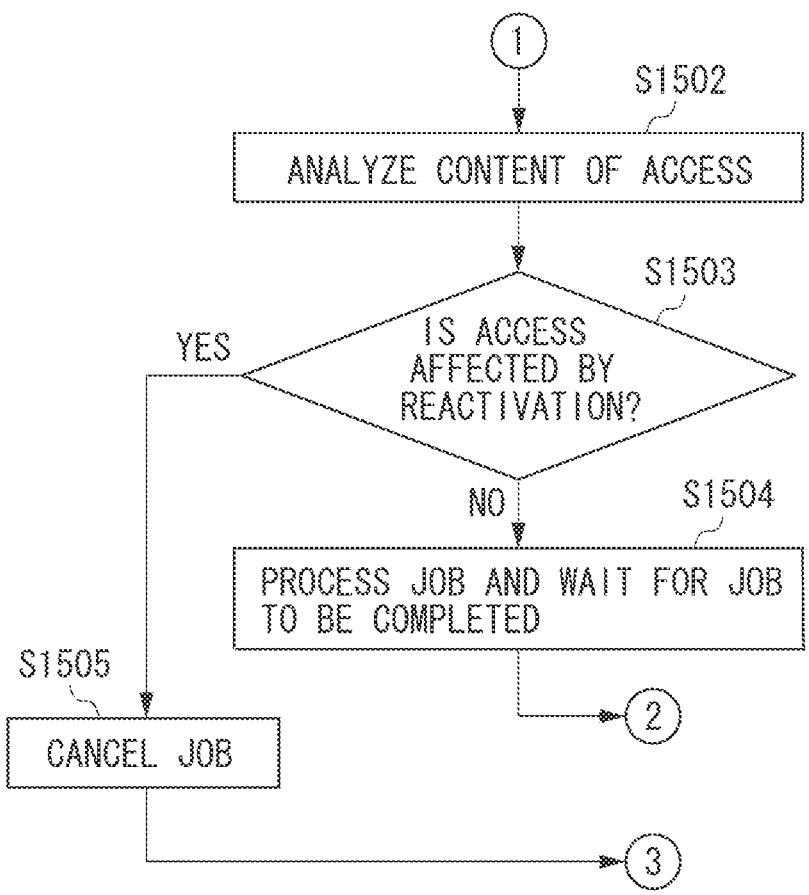

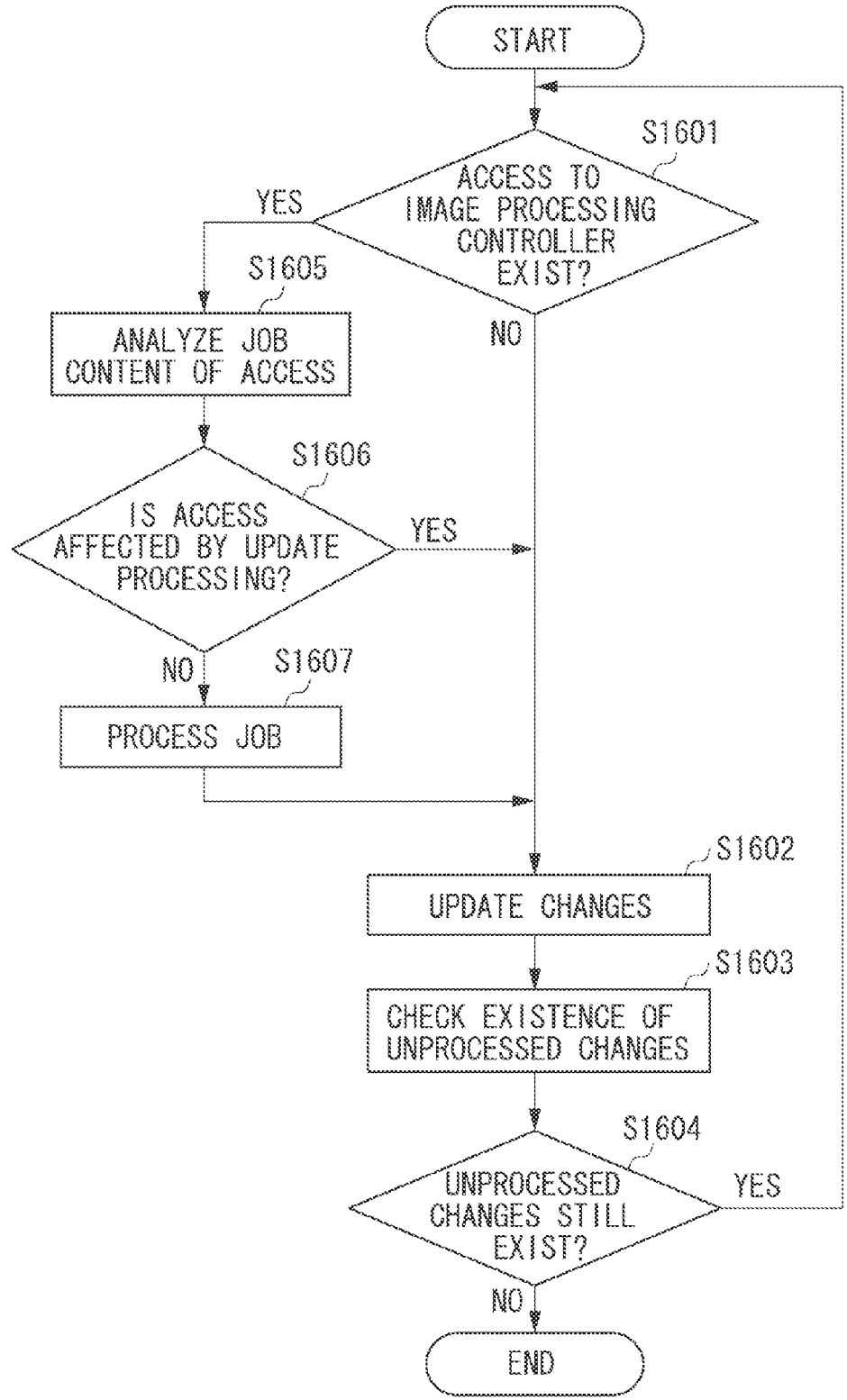

IMAGE FORMING SYSTEMS, AND METHODS OF USING SAME

BACKGROUND OF THE INVENTION

1. Field of the Invention

The present invention(s) relate to one or more image forming systems including an image forming apparatus and an image processing apparatus, and methods of using same.

2. Description of the Related Art

In recent years, with an increasing demand for power saving of devices such as an image forming apparatus and an image processing apparatus, there has been provided a technique for shifting a power state of the image forming apparatus to a power saving state according to a certain condition (e.g., the image forming apparatus has not been operated for a certain period of time) (see Japanese Patent Application Laid-Open No. 2007-223275 and Japanese Patent Application Laid-Open No. 2010-2500).

In this type of image forming apparatus, the state of the image forming apparatus shifts to a power saving state when a certain period of time has passed after ending printing processing executed by a printer unit and scanning processing executed by a scanner unit, or after ending communication with an external device.

In addition, an image processing apparatus for executing image processing in cooperation with the image forming apparatus may be connected to such an image forming apparatus. The image processing apparatus connected to the image forming apparatus periodically acquires various kinds of image forming apparatus information such as connection unit information, sheet feed stage information, sheet information, and toner information. Then, the image processing apparatus updates the image forming apparatus information stored in the image processing apparatus by itself by using the acquired image forming apparatus information. Further, the image processing apparatus notifies, and makes known, the acquired image forming apparatus information to a computer of a user who uses the image forming apparatus by using the acquired image forming apparatus information.

As described above, because the image forming apparatus and the image processing apparatus periodically communicate with each other, changes in the image forming apparatus information are reflected in the image processing apparatus within a certain period of time if the image forming apparatus information has been updated, and thus uniformity of the information across the entire image forming system can be ensured.

However, the state of the image processing apparatus shifts to a power saving state when the image processing apparatus is not in use. When the image processing apparatus is in the power saving state, the periodic communication between the image forming apparatus and the image processing apparatus is not executed. Therefore, in a case where the image forming apparatus information is changed while the image processing apparatus is in the power saving state, uniformity of the information across the entire image forming system immediately after the image processing apparatus has returned from the power saving state may not be maintained.

In this case, unchanged image forming apparatus information is notified, and made known, to the computer of the user who uses the image forming apparatus, so that the user may create a job based on the unchanged information. In such a case, malfunctions may occur in the image forming system, and thus an output acquired based on that job may be different from the output desired by the user, or the job that cannot be executed by the image forming apparatus may be created.

SUMMARY OF THE INVENTION

The present invention(s) are directed to one or more image forming systems, and methods of using same, capable of avoiding and/or preventing any malfunctions, which may otherwise be caused by a lack of uniformity of information when not using one or more features of the present invention(s), from occurring by ensuring the uniformity of the information even if the configuration of an image forming apparatus has been changed while an image processing apparatus is in the power saving state.

According to at least one aspect of the present invention(s), an image forming system includes an image processing apparatus configured to generate and transmit image data based on a printing request by receiving the printing request from an information processing apparatus, and an image forming apparatus configured to execute printing based on the image data transmitted from the image processing apparatus. In one or more embodiments of the image forming system, the image processing apparatus includes a storage unit configured to store configuration information of the image forming apparatus, a return unit configured to return the state of the image processing apparatus from a power saving state in which at least power is supplied to a first communication unit for receiving data transmitted from the information processing apparatus in a case where the image processing apparatus detects a predetermined condition, and a request unit configured to transmit a request for acquiring the configuration information of the image forming apparatus to the image forming apparatus in a case where the return unit returns the image processing apparatus from the power saving state, whereas the image forming apparatus includes a transmission unit configured to transmit the configuration information of the image forming apparatus to the image processing apparatus based on the request transmitted by the request unit, and the image processing apparatus further includes an update unit configured to update the configuration information stored in the storage unit by using the configuration information of the image forming apparatus transmitted by the transmission unit. In one or more additional embodiments of the image forming system, the image processing apparatus of the image forming system may further include a notification unit configured to notify the image forming apparatus that the state of the image processing apparatus has returned from the power saving state in a case where the return unit returns the image processing apparatus from the power saving state. Alternatively, one or more image processing apparatuses of one or more image forming systems may employ the notification unit instead of the request unit.

Further features of the present invention(s) will become apparent from the following description of exemplary embodiments with reference to the attached drawings.

BRIEF DESCRIPTION OF THE DRAWINGS

FIG. 14 (including FIGS. 14A and 14B) is a flowchart illustrating an example of an update operation of the image forming apparatus information executed by the image processing controller according to a third exemplary embodiment.

FIG. 15 is a flowchart illustrating an example of an updating operation of only changes in the image forming apparatus information executed by the image processing controller according to a fourth exemplary embodiment.

DESCRIPTION OF THE EMBODIMENTS

Various exemplary embodiments, features, and aspects of the present invention(s) will be described in detail below with reference to the drawings.

Figure 1:
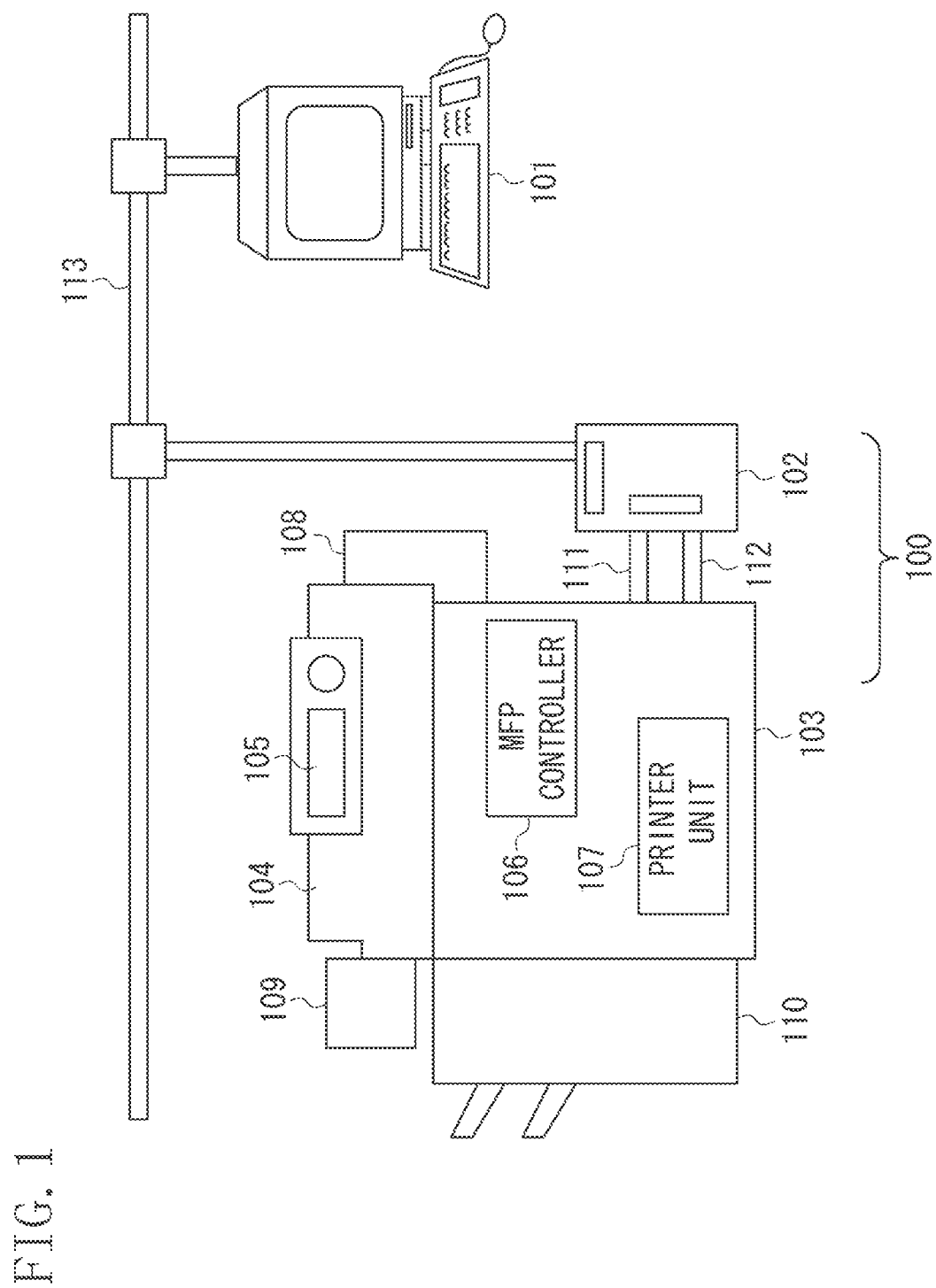
FIG. 1 is a diagram illustrating an example of an overall configuration of an image forming system according to at least a first exemplary embodiment of the present invention.

FIG. 1 is a diagram illustrating an example of an overall configuration of an image forming system according to at least a first exemplary embodiment of the present invention(s). An image forming system 100 includes an image processing controller 102 and an image forming apparatus 103. The image forming system 100 is communicably connected to a client computer 101.

The client computer 101 and the image processing controller 102 are communicably connected to each other via a network 113 such as Ethernet (registered mark), a local area network, etc. The image processing controller 102 and the image forming apparatus 103 are connected to each other via a control cable 111 and an image video cable 112.

In the present exemplary embodiment, the image forming apparatus 103 is not connected to the network 113 directly. Therefore, the image forming apparatus 103 communicates with the client computer 101 via the image processing controller 102. In addition or in the alternative, the image forming apparatus 103 can be connected directly to the network 113. In other words, the image forming apparatus 103 can be directly and communicably connected to the client computer 101.

The client computer 101 provides a printing instruction to the image forming apparatus 103 by activating an application. The image processing controller 102 executes image processing in cooperation with the image forming apparatus 103. The image forming apparatus 103 may be a multifunction peripheral (MFP).

<Configurations of at Least One Image Forming Apparatus and at Least One Image Processing Controller>

Figure 2:
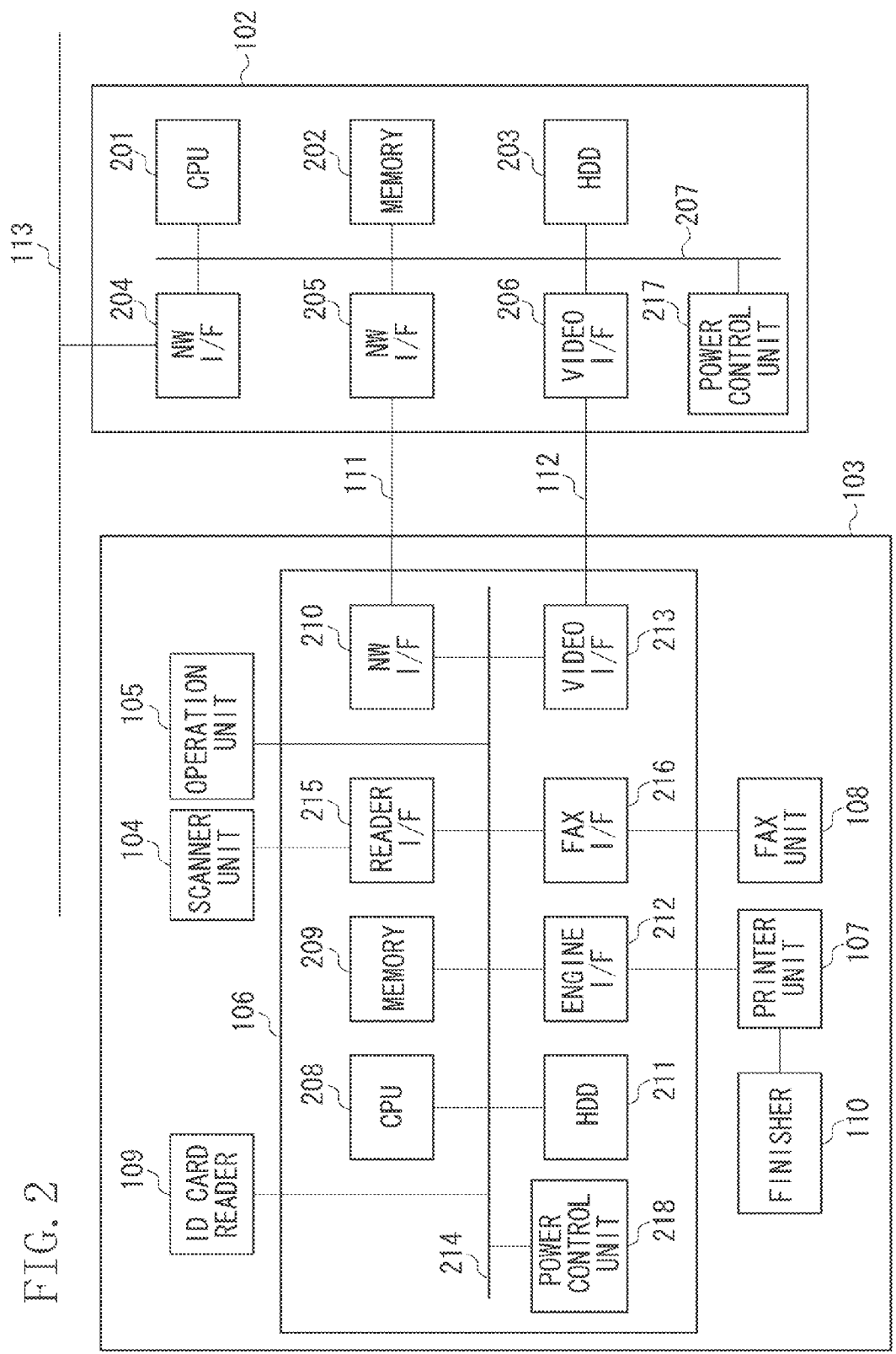
FIG. 2 is a block diagram illustrating an example of hardware configurations of an image forming apparatus and an image processing controller.

FIG. 2 is a block diagram illustrating an example of a hardware configuration of the image forming apparatus 103 and the image processing controller 102.

The image processing controller 102 includes a central processing unit (CPU) 201, a memory 202, a hard disk drive (HDD) 203, a network (NW) interface (I/F) 204, a network I/F 205, a video I/F 206, and a power control unit 217.

The CPU 201 controls respective units in the image processing controller 102, executes calculations, and executes a program stored in a storage unit (e.g., the memory 202 or the HDD 203) via a system bus 207. In one or more embodiments, the memory 202 is used as a work memory of the CPU 201. The hard disk drive (HDD) 203 is a large-capacity storage device for storing various control programs executed by the CPU 201 and image data. Another storage device, such as a solid state drive (SSD), may be provided therein instead of the HDD 203.

The network I/F (NW I/F) 204 communicates with another apparatus, such as the client computer 101, via the network 113. Further, the network I/F (NW I/F) 205 transmits and receives a control command to/from the image forming apparatus 103 via the control cable 111. The video I/F 206 transmits and receives image data to/from the image forming apparatus 103 via the image video cable 112. The power control unit 217 controls power supplied to each unit of the image processing controller 102.

Further, the image forming apparatus 103 includes a scanner unit 104, an operation unit 105, an MFP controller 106, a printer unit 107, a FAX unit 108, an identification (ID) card reader 109, and a finisher 110.

The scanner unit 104 inputs image data by reading a document. The operation unit 105 includes various keys and a panel. Further, the operation unit 105 receives various instructions from a user through the various keys. Furthermore, the operation unit 105 displays various kinds of information on the panel.

The MFP controller 106 controls the above-described scanner unit 104 and the printer unit 107. The MFP controller 106 will be described in detail below. The printer unit 107 executes printing on a sheet of paper based on image data. The FAX unit 108 is connected to a telephone line (not illustrated) so as to execute facsimile input-output processing via the telephone line.

The ID card reader 109 reads information from an ID card for identifying the user. The finisher 110 serves as a post-processing device for executing processing (post-processing) such as sheet discharging, sorting, stapling, punching, and cutting with respect to a sheet of paper (hereinafter, referred to as "sheet") by receiving the sheet on which an image is formed by the printer unit 107. In addition, the finisher 110 is attachable/detachable to/from a main body of the image forming apparatus 103.

The image forming apparatus 103 configured as described above can execute the following functions:

<Copy Function>

Image data of a document read by the scanner unit 104 is stored in the HDD 211, so that printing is executed on a sheet by the printer unit 107 based on that image data.

<SEND Function>

Image data of a document read by the scanner unit 104 is transmitted to the client computer 101 via the network 113.

<BOX Function>

Image data of a document read by the scanner unit 104 as well as image data transmitted from the client computer 101 are stored in the HDD 211.

<Print Function>

Page description language (PDL) data transmitted from the client computer 101 is interpreted and printed by the printer unit 107.

The image processing controller 102 periodically acquires various kinds of information of the image forming apparatus 103 (e.g., information of connected devices such as a finisher, sheet feed stage information, sheet information, and toner information). Further, the image processing controller 102 updates the image forming apparatus information stored in the image processing controller 102 by using the acquired information of the image forming apparatus 103. The image forming apparatus information is stored in and managed by a database included in the HDD 203 (see FIG. 2) mounted within the image processing controller 102. Further, the image processing controller 102 notifies the above information of the image forming apparatus 103 to a computer of a user who uses the image forming apparatus 103. The CPU 201 reads and executes the program stored in the memory 202 or the HDD 203 to realize the above-described control processing.

<Details of an MFP Controller of at Least One Image Forming Apparatus>

Now, the MFP controller 106 of the image forming apparatus 103 will be described in detail with reference to FIG. 2.

The MFP controller 106 includes a CPU 208, a memory 209, a network I/F 210, an HDD 211, an engine I/F 212, a video I/F 213, a reader I/F 215, a FAX I/F 216, and a power control unit 218.

The CPU 208 controls each unit of the image forming apparatus 103 and executes calculation via a system bus 214 by executing a program stored in a storage device such as the memory 209 or the HDD 211. The memory 209 is used as a work memory of the CPU 208. The network I/F (NW I/F) 210 transmits and receives a control command to/from the image processing controller 102 via the control cable 111.

The hard disk drive (HDD) 211 is a large-capacity storage device for storing various control programs executed by the CPU 208 and image data. Another storage device, such as a solid state drive (SSD), may be provided therein instead of the HDD 211.

The engine I/F 212 transmits and receives a control command to/from the printer unit 107. The video I/F 213 transmits and receives image data to/from the image processing controller 102 via the image video cable 112. The reader I/F 215 transmits and receives a control command to/from the scanner unit 104 and the operation unit 105. The FAX I/F 216 serves as an interface for connecting the FAX unit 108. The power control unit 218 controls power supplied to each unit of the image forming apparatus 103.

Hereinafter, power supply control of the image processing controller 102 and the image forming apparatus 103 will be described. Power supplied to the image processing controller 102 is managed by the power control unit 217. When the image processing controller 102 is in a stand-by state, the power control unit 217 controls power to be supplied to the respective units such as the CPU 201, the memory 202, the HDD 203, the network I/F 204, the network I/F 205, and the video I/F 206.

When the image processing controller 102 is in a power saving state, the power control unit 217 stops supplying power to the CPU 201, the HDD 203, and the video I/F 206. In the power saving state, the power control unit 217 controls power to be supplied to limited portions such as the memory 202, the network I/F 204, and the network I/F 205.

On the other hand, power supplied to the image forming apparatus 103 is managed by the power control unit 218. When the image forming apparatus 103 is in a stand-by state, the power control unit 218 controls power to be supplied to the scanner unit 104, the operation unit 105, the MFP controller 106, the printer unit 107, the FAX unit 108, the ID card reader 109, and the finisher 110.

When the image forming apparatus 103 is in a power saving state, the power control unit 218 stops supplying power to the scanner unit 104, the operation unit 105, the printer unit 107, the ID card reader 109, and the finisher 110. Further, in the power saving state, the power control unit 218 also stops supplying power to the respective units included in the MFP controller 106, such as the CPU 208, the HDD 211, the engine I/F 212, the video I/F 213, the reader I/F 215, and the FAX I/F 216. In the power saving state, the power control unit 218 supplies power to the limited units such as the memory 209 and the network I/F 210, and stops supplying power to the rest of the units.

<Software Configuration of an Image Processing Controller>

Figure 3:
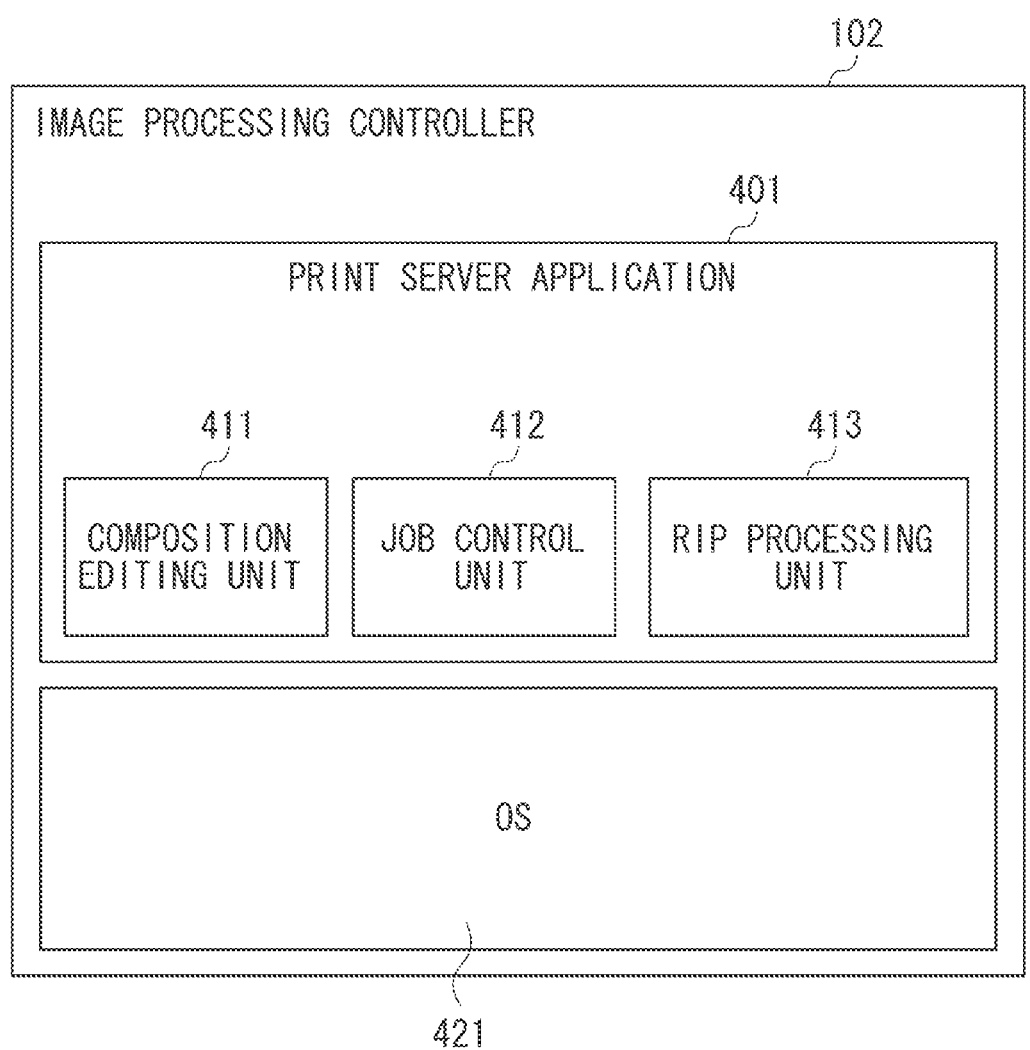
FIG. 3 is a block diagram illustrating an example of at least one software configuration of the image processing controller.

FIG. 3 is a block diagram illustrating an example of a software configuration of the image processing controller 102. The example of the software configuration of the image processing controller 102 will be described with reference to FIG. 3. The CPU 201 reads and executes a program stored in the memory 202 or the HDD 203 of the image processing controller 102 to realize processing illustrated in FIG. 3.

An operating system (OS) 421 is an OS (i.e., basic software) of the image processing controller 102. A print server application 401 is application software operating on the OS 421 executed by the CPU 201. The print server application 401 includes a composition editing unit 411, a job control unit 412, and a raster image processor (RIP) processing unit 413, and executes various kinds of predetermined processing including image processing.

The composition editing unit 411 serves as an editing unit for executing composition editing processing in order to edit the image data in page units into a bookbinding composition format based on the instruction from the client computer 101. The job control unit 412 serves as a control unit for controlling a printing job based on the instruction from the client computer 101. More specifically, the job control unit 412 controls the printing order of the print job according to the printing data and the instruction thereof received from the client computer 101. The RIP processing unit 413 serves as a processing unit for executing converting processing for rasterizing the PDL into a printable raster image when composition processing is executed by the composition editing unit 411, or the actual image forming processing is executed by the job control unit 412.

<Transition of a Power State in an Image Processing Controller>

Figure 4:
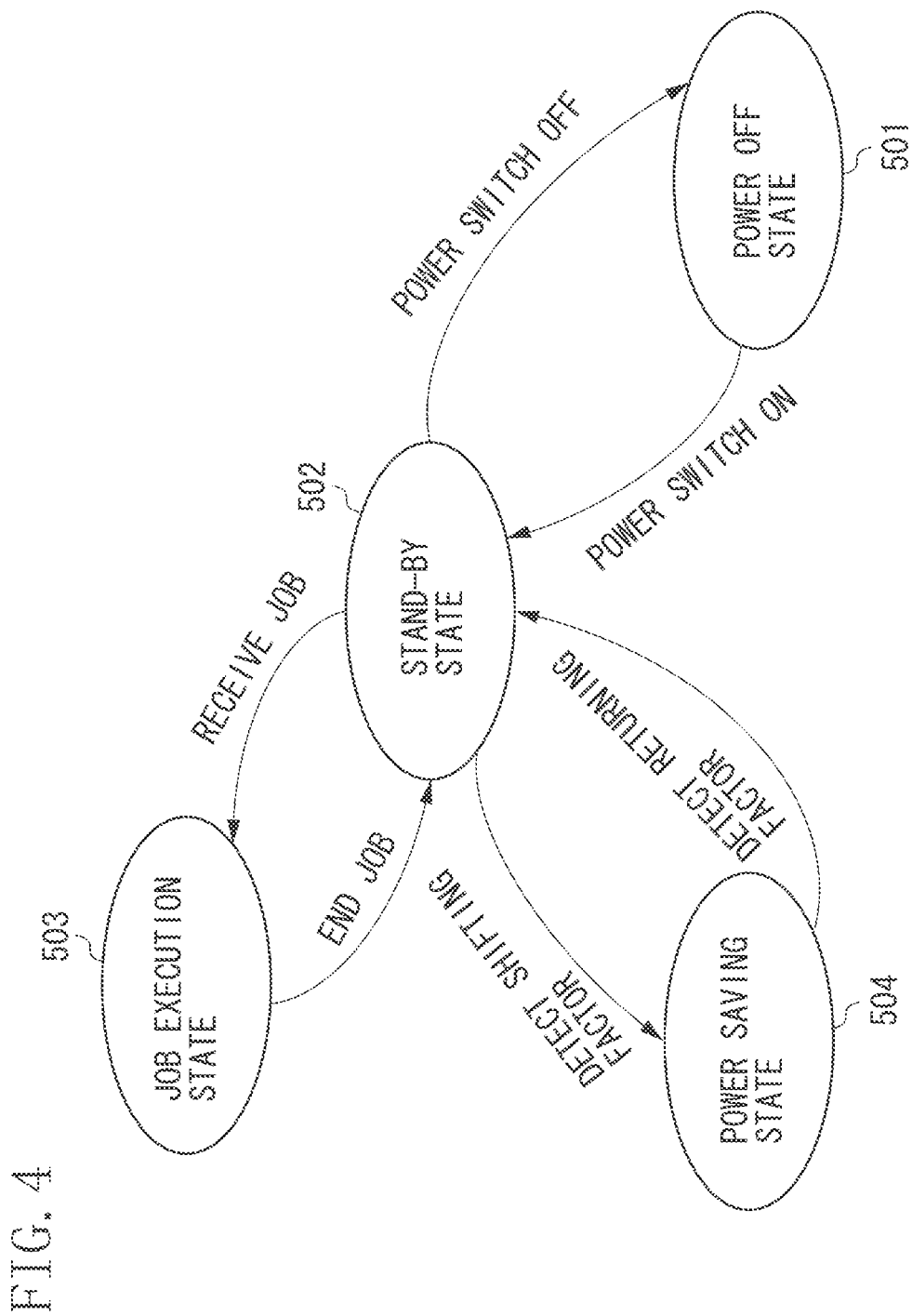
FIG. 4 is a state transition diagram illustrating an example of a transition of a power state of the image processing controller.

FIG. 4 is a state transition diagram illustrating an example of transition of the power state in the image processing controller 102.

The state of the image processing controller 102 according to the present exemplary embodiment can shift to any one of a power OFF state 501, a stand-by state 502, a job execution state 503, and a power saving state 504.

In the present exemplary embodiment, the above-described four power states are taken as the examples. However, the present invention is not limited thereto, and the state of the image processing controller 102 may shift to another power state. For example, the state of the image processing controller 102 may shift to a suspend state, or a hibernation state.

The suspend state allows the image processing controller 102 to promptly return to the stand-by state 502. In the suspend state, power is continuously kept supplying to the memory 202, so that the image processing controller 102 is booted to return to the stand-by state 502 by using the state information of the image processing controller 102 stored in the memory 202.

The hibernation state also allows the image processing controller 102 to promptly return to the stand-by state 502. A power state of the hibernation state is similar to the power OFF state 501, and thus the power supplied to each unit of the image processing controller 102 is stopped. However, the hibernation state is different from the power OFF state 501 in that the state of the image processing controller 102 is stored in the HDD 203 before the power state thereof is shifted to the hibernation state. Thus, the image processing controller 102 promptly returns to the stand-by state 502 from the hibernation state based on the information stored in the HDD 203.

When the power states of the image processing controller 102 are sorted in descending order of power consumption, the order thereof is as follows:
job execution state 503>stand-by state 502>power saving state 504>power OFF state 501.

In the power OFF state 501, a power switch such as a seesaw switch (not illustrated) of the image processing controller 102 is turned OFF, so that the power supplied to the entire configuration of the image processing controller 102 is stopped. When the user turns on the power switch of the image processing controller 102 in the power OFF state 501, the state of the image processing controller 102 shifts to the stand-by state 502.

In the stand-by state 502, the image processing controller 102 is waiting for the access from the client computer 101, so that power is supplied to the entire configuration of the image processing controller 102. In addition, in the stand-by state 502, the power does not have to be supplied to the entire configuration of the image processing controller 102. Power may be supplied to the at least one configuration thereof whereas the power does not have to be supplied to the rest of the configuration, such as the video I/F 206. When the client computer 101 accesses the image processing controller 102 via the network in the stand-by state 502, the state of the image processing controller 102 shifts to the job execution state 503. Further, if a sleep shifting factor occurs in the stand-by state 502, the state of the image processing controller 102 shifts to the power saving state 504.

For example, the following conditions (1) to (3) can be the sleep shifting factors:
(1) A sleep transition button (not illustrated) is pressed by the user.
(2) A predetermined period of time has passed in the stand-by state 502 without executing any printing job.
(3) A predetermined period of time has passed since the client computer 101 has accessed the image processing controller 102 through the network last time.

Further, if the user turns off the power switch of the image processing controller 102 in the stand-by state 502, the image processing controller 102 executes shut-down processing and the state of the image processing controller 102 shifts to the power OFF state 501. The shut-down processing is the processing for ending the OS or the applications in order to turn off the image processing controller 102.

In the job execution state 503, the image processing controller 102 is executing the job, so that power is supplied to the entire configuration of the image processing controller 102. Similar to the stand-by state 502, the power does not have to be supplied to the entire configuration of the image processing controller 102 in the job execution state 503. The power may be supplied to the at least one configuration thereof whereas the power does not have to be supplied to the rest of the configuration, such as the video I/F 206. Further, the power does not have to be supplied to the unit that is not used for the job execution. More specifically, when only editing the printing job is performed without executing printing, the power supplied to the video I/F 206 may be stopped because the video I/F 206 is not used in the editing processing. When the job has been completed in the job execution state 503, the state of the image processing controller 102 shifts to the stand-by state 502.

In the power saving state 504, the image processing controller 102 stands by in a power saving state, so that power is supplied to a part of the configuration thereof including the network I/F 204. In the power saving state 504, the power supplied to the video I/F 206 is stopped. When the image processing controller 102 receives a returning factor in the power saving state 504, the state of the image processing controller 102 shifts to the stand-by state 502. In addition, in the power saving state 504, the network I/F 204 and the network I/F 205 can respond to a simple packet transmitted through the network. This function is known as "proxy response". An Address Resolution Protocol (ARP) request, a Simple Network Management Protocol (SNMP) state acquisition, and an Internet Control Message Protocol (ICMP) neighbor discovery are taken as the examples of the simple packet.

The following conditions (1) to (3) can be the returning factors:
(1) A wake-up button is pressed by the user.
(2) The client computer 101 accesses the image processing controller 102 via the network.
(3) The image forming apparatus 103 accesses the image processing controller 102 via the network.

The operations executed by the image processing controller 102 when the state of the image processing controller 102 shifts to and returns from the power saving state 504 will be described below with reference to FIGS. 5 and 6.

<Description on Operation Executed by an Image Processing Controller when a State of the Image Processing Controller Shifts to a Power Saving State>

First, the operation executed by the image processing controller 102 when the state of the image processing controller 102 shifts to the power saving state 504 in the present exemplary embodiment will be described with reference to FIG. 5.

Figure 5:
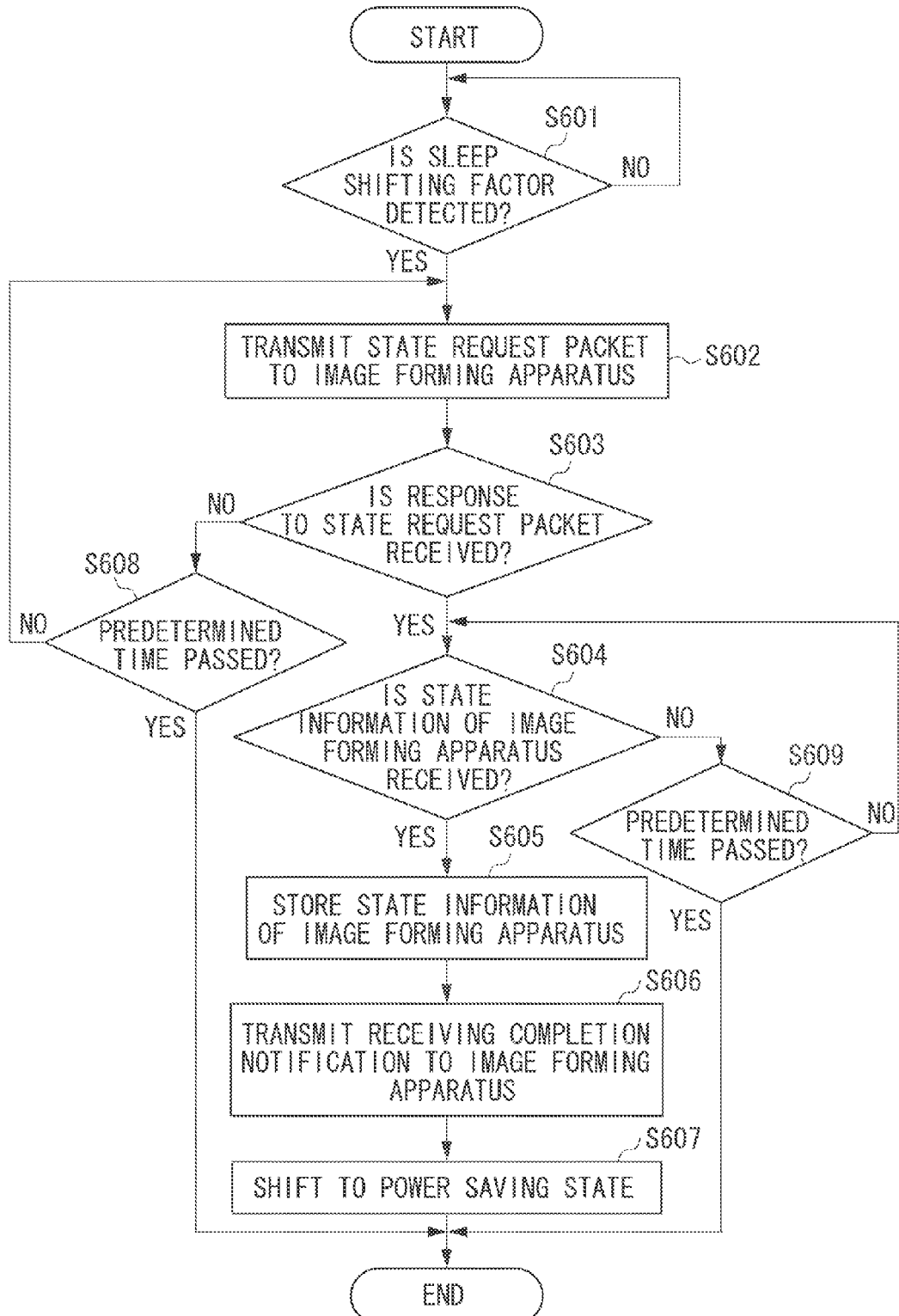
FIG. 5 is a flowchart illustrating an example of an operation executed by the image processing controller when the state of the image processing controller shifts to a power saving state according to a first exemplary embodiment.

FIG. 5 is a flowchart illustrating an example of an operation executed by the image processing controller 102 when the state of the image processing controller 102 shifts to the power saving state 504 in the present exemplary embodiment. The CPU 201 executes a program loaded on the memory 202 to realize the processing illustrated in the flowchart of FIG. 5.

When the state of the image processing controller 102 shifts to the stand-by state 502 after executing a job, in step S601, the CPU 201 determines whether the sleep shifting factor is detected by monitoring the occurrence of the sleep shifting factor. In a case where the CPU 201 determines that the sleep shifting factor is not detected (NO in step S601), the CPU 201 repeatedly executes the processing in step S601 until the sleep shifting factor is detected.

On the other hand, in a case where the CPU 201 determines that the sleep shifting factor is detected (YES in step S601), the processing proceeds to step S602. In step S602, the CPU 201 transmits a state request command to the image forming apparatus 103 via the network I/F 205. The state request command to the image forming apparatus 103 is a command allowing the image processing controller 102 to request the image forming apparatus 103 to transmit the current state information of the image forming apparatus 103. The state request command to the image forming apparatus 103 is transmitted to the image forming apparatus 103 via the control cable 111.

Next, in step S603, the CPU 201 determines whether a response (e.g., an acknowledgement (ACK) response in Transmission Control Protocol (TCP)) indicating that the image forming apparatus 103 has received the state request command transmitted in step S602 is received from the image forming apparatus 103. Then, in a case where the CPU 201 determines that the response indicating that the image forming apparatus 103 has received the state request command is received (YES in step S603), the processing proceeds to step S604. In step S604, the CPU 201 determines whether the state information data from the image forming apparatus 103 is received.

Then, in a case where the CPU 201 determines that the state information data from the image forming apparatus 103 is received (YES in step S604), the processing proceeds to step S605. In step S605, the CPU 201 stores the state information data received from the image forming apparatus 103 in the HDD 203. Next, in step S606, the CPU 201 transmits a receiving completion notification to the image forming apparatus 103.

Further, in connection with the transmission of the receiving completion notification to the image forming apparatus 103, in step S607, the CPU 201 shifts the image processing controller 102 to the power saving state 504 from the stand-by state 502. More specifically, the CPU 201 instructs the power control unit 217 to stop supplying power to the CPU 201 and the HDD 203. The CPU 201 executes the sleep shift processing before the power control unit 217 stops supplying power thereto. In the sleep shift processing, the CPU 201 stores a state of the image processing controller 102 immediately before shifting to the power saving state 504 in the memory 202.

Further, in step S603, in a case where the CPU 201 determines that the response indicating that the image forming apparatus 103 has received the state request command is not received (NO in step S603), the processing proceeds to step S608. In step S608, the CPU 201 determines whether a predetermined time has passed after transmitting the state request command to the image forming apparatus 103. In a case where the CPU 201 determines that the predetermined time has not passed (NO in step S608), the processing proceeds to step S602. In step S602, the CPU 201 transmits the state request command to the image forming apparatus 103 via the network I/F 205 again. On the other hand, in a case where the CPU 201 determines that the predetermined time has passed (YES in step S608), the CPU 201 ends the processing of the flowchart without shifting the image processing controller 102 to the power saving state 504.

Further, in step S604, in a case where the CPU 201 determines that the state information data from the image forming apparatus 103 is not received (NO in step S604), the processing proceeds to step S609. In step S609, the CPU 201 determines whether a predetermined time has passed after receiving the response indicating that the image forming apparatus 103 has received the state request command. Then, in a case where the CPU 201 determines that the predetermined time has not passed (NO in step S609), the processing proceeds to step S604. On the other hand, in a case where the CPU 201 determines that the predetermined time has passed (YES in step S609), the CPU 201 ends the processing of the flowchart without shifting the image processing controller 102 to the power saving state 504.

<Description on an Operation Executed by an Image Processing Controller when a State of the Image Processing Controller Returns from a Power Saving State>

Next, the operation executed by the image processing controller 102 when the state of the image processing controller 102 returns to the stand-by state 502 from the power saving state 504 according to the present exemplary embodiment will be described with reference to FIG. 6.

Figure 6:
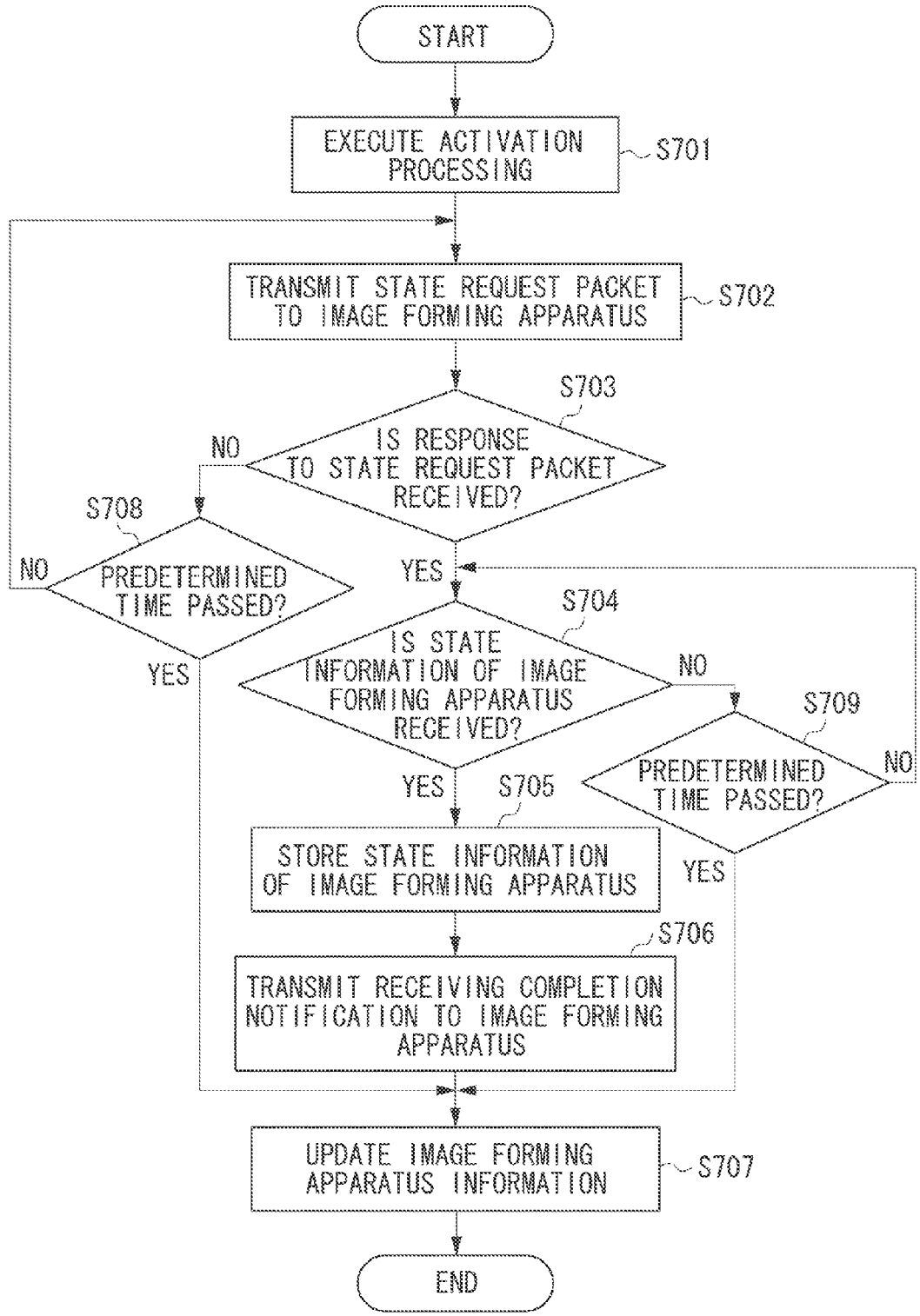
FIG. 6 is a flowchart illustrating an example of an operation executed by the image processing controller when the image processing controller returns from the power saving state according to the first exemplary embodiment.

FIG. 6 is a flowchart illustrating an example of an operation executed by the image processing controller 102 when the state of the image processing controller 102 returns from the power saving state 504 according to the present exemplary embodiment. The CPU 201 executes a program loaded on the memory 202 to realize the processing illustrated in the flowchart of FIG. 6.

In a case where the sleep returning factor occurs while the image processing controller 102 is in the power saving state 504, the power control unit 217 starts supplying power to the CPU 201 again. With this processing, the state of the image processing controller 102 returns to the stand-by state 502 from the power saving state 504. The conditions such as the user presses the wake-up button (not illustrated), the image processing controller 102 receives a job from the client computer 101, or the image processing controller 102 is accessed by the image forming apparatus 103 via the network can be the sleep returning factors. The CPU 201 executes the processing according to the flowchart in FIG. 6 by executing a program loaded on the memory 202 when power is supplied thereto.

First, in step S701, the CPU 201 executes activation processing when power is supplied thereto. In the activation processing, the CPU 201 returns the image processing controller 102 to a state before shifting to the power saving state 504 by using the state information of the image processing controller 102 stored in the memory 202. Then, in step S702, the CPU 201 transmits a state request command to the image forming apparatus 103 via the network I/F 205. The state request command to the image forming apparatus 103 is a command allowing the image processing controller 102 to request the image forming apparatus 103 to transmit the current state information of the image forming apparatus 103. The state request command to the image forming apparatus 103 is transmitted to the image forming apparatus 103 via the control cable 111.

Next, in step S703, the CPU 201 determines whether a response (e.g., an ACK response in TCP) indicating that the image forming apparatus 103 has received the state request command transmitted in step S702 is received from the image forming apparatus 103. Then, in a case where the CPU 201 determines that the response indicating that the image forming apparatus 103 has received the state request command is received (YES in step S703), the processing proceeds to step S704. In step S704, the CPU 201 determines whether the state information data from the image forming apparatus 103 is received.

Then, in a case where the CPU 201 determines that the state information data from the image forming apparatus 103 is received (YES in step S704), the processing proceeds to step S705. In step S705, the CPU 201 stores the state information data received from the image forming apparatus 103 in the HDD 203. Next, in step S706, the CPU 201 transmits a receiving completion notification to the image forming apparatus 103.

Further, in connection with the transmission of the receiving completion notification to the image forming apparatus 103, in step S707, the CPU 201 updates the image forming apparatus information stored in the image processing controller 102. The processing for updating the image forming apparatus information executed in step S707 will be described in detail below with reference to FIG. 7.

Further, in step S703, in a case where the CPU 201 determines that the response indicating that the image forming apparatus 103 has received the state request command is not received (NO in step S703), the processing proceeds to step S708. In step S708, the CPU 201 determines whether a predetermined time has passed after transmitting the state request command to the image forming apparatus 103. In a case where the CPU 201 determines that the predetermined time has not passed (NO in step S708), the processing proceeds to step S702. In step S702, the CPU 201 transmits the state request command to the image forming apparatus 103 via the network I/F 205 again. On the other hand, in a case where the CPU 201 determines that the predetermined time has passed (YES in step S708), the CPU 201 advances the processing to step S707 without receiving the state information data of the image forming apparatus 103.

Further, in step S704, in a case where the CPU 201 determines that the state information data from the image forming apparatus 103 is not received (NO in step S704), the processing proceeds to step S709. In step S709, the CPU 201 determines whether a predetermined time has passed after receiving the response indicating that the image forming apparatus 103 has received the state request command. Then, in a case where the CPU 201 determines that the predetermined time has not passed (NO in step S709), the processing proceeds to step S704. On the other hand, in a case where the CPU 201 determines that the predetermined time has passed (YES in step S709), the CPU 201 advances the processing to step S707 without receiving the state information data of the image forming apparatus 103.

<Operation for Updating Image Forming Apparatus Information Stored in an Image Processing Controller>

Hereinafter, an operation for updating the image forming apparatus information stored in the image processing controller 102 (e.g., processing executed in step S707 in FIG. 6) according to the present exemplary embodiment will be described below with reference to FIG. 7.

Figure 7:
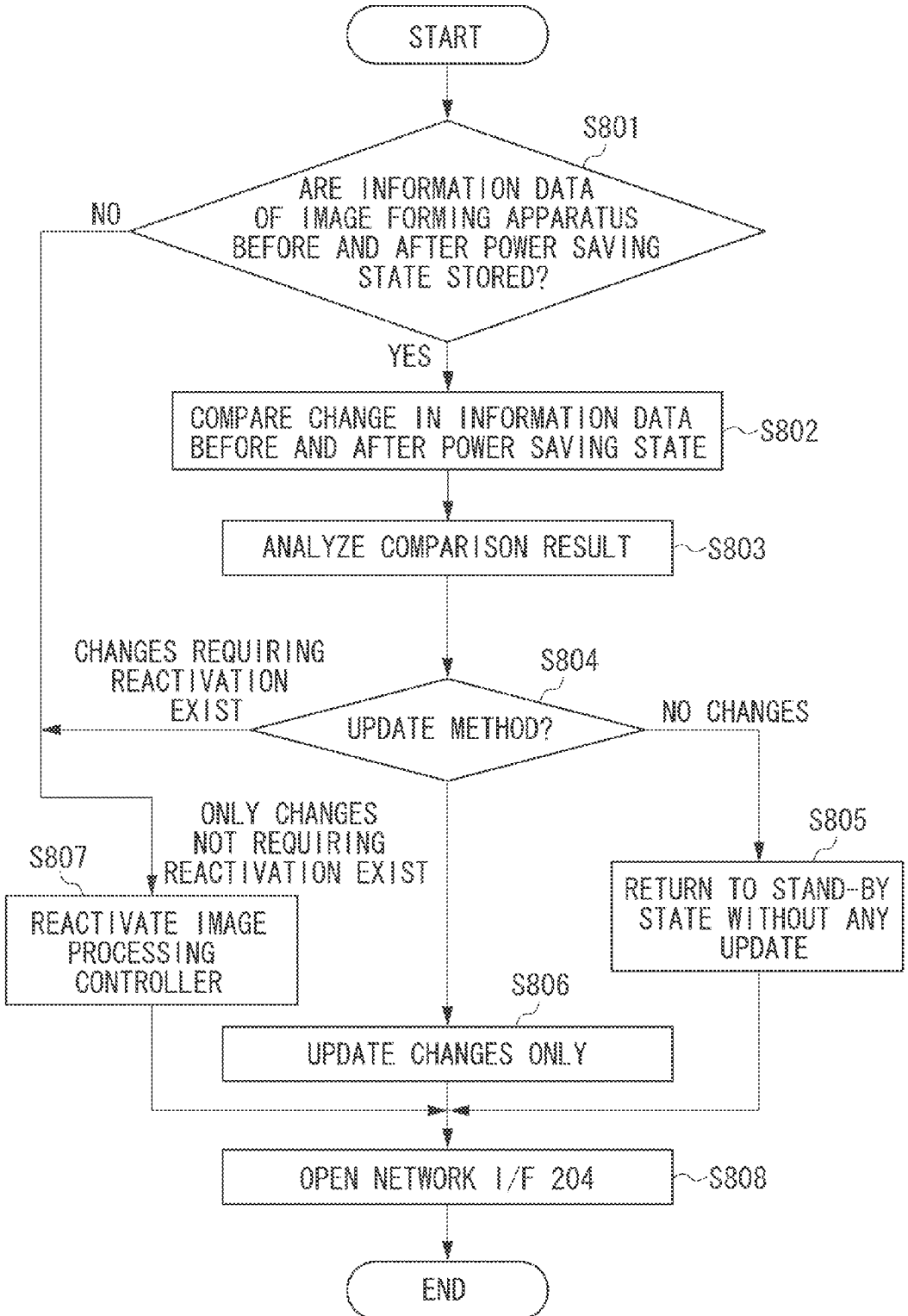
FIG. 7 is a flowchart illustrating an example of an update operation of image forming apparatus information executed by the image processing controller according to the first exemplary embodiment.

FIG. 7 is a flowchart illustrating an example of the operation for updating the image forming apparatus information stored in the image processing controller 102 (e.g., processing executed in step S707 in FIG. 6), which is to be executed when the image processing controller 102 returns from the power saving state 504 in the present exemplary embodiment. The CPU 201 executes a program loaded on the memory 202 to realize the processing illustrated in the flowchart of FIG. 7.

In step S801, the CPU 201 checks whether pieces of state information data of the image forming apparatus 103 respectively received at the time of shifting to the power saving state 504 from the stand-by state 502 and at the time of returning to the stand-by state 502 from the power saving state 504 (i.e., information data of the image forming apparatus 103 before and after the power saving state 504) are stored in the HDD 203. The state information data of the image forming apparatus 103 received at the time of shifting to the power saving state 504 from the stand-by state 502 corresponds to the state information data received in step S604 and stored in step S605 in FIG. 5 before shifting to the power saving state 504. Further, the state information data of the image forming apparatus 103 received at the time of returning to the stand-by state 502 from the power saving state 504 corresponds to the state information data received in step S704 and stored in step S705 in FIG. 6 after returning from the power saving state 504.

Then, in a case where the CPU 102 determines that both pieces of the state information data of the image forming apparatus 103 are stored (YES in step S801), the processing proceeds to step S802. In step S802, the CPU 201 compares the pieces of the state information data of the image forming apparatus 103.

Next, in step S803, the CPU 201 analyzes a comparison result by extracting only differences (changes) from the comparison result acquired in step S802. Then, in step S804, based on an analysis result acquired in step S803, the CPU 201 determines an update method of the changes.

In a case where the CPU 201 determines that no changes exist (NO in step S804), the processing proceeds to step S805. In step S805, the CPU 201 returns the image processing controller 102 to the stand-by state 502 without updating the image forming apparatus information stored in the image processing controller 102.

In a case where the CPU 201 determines that no changes requiring reactivation/rebooting exist ("ONLY CHANGES NOT REQUIRING REACTIVATION EXIST" in step S804), the processing proceeds to step S806. In step S806, the CPU 201 individually updates the information according to the changes.

In addition, the following conditions (1) to (5) can be taken as the specific examples of "CHANGES NOT REQUIRING REACTIVATION":
(1) A change in sheet feed stage information (e.g., sheet type, and sheet size).
(2) A change in a remaining amount of sheets.
(3) A change in a remaining amount of toner.
(4) A change in location information (installation site).
(5) A change in sheet discharge information (e.g., sheets are fully-loaded, loaded, or not loaded on an output bin).

In a case where the CPU 201 determines that the changes requiring the reactivation/rebooting processing exist ("CHANGES REQUIRING REACTIVATION EXIST" in step S804), the processing proceeds to step S807. In step S807, the CPU 201 reboots (e.g., restarts) the entire image processing controller 102 and resets all of the information of the image processing controller 102.

In addition, the following conditions (1) and (2) can be taken as the specific examples of "CHANGES REQUIRING REACTIVATION":
(1) A change in a type of the finisher 110.
(2) A change in a setting value of the finisher 110.

After executing the processing in any one of steps S805, S806, and S807, the processing proceeds to step S808. In step S808, the CPU 201 opens the network I/F 204 to enable the communications between the CPU 201 and an external apparatus via the network 113, and ends the processing of the flowchart. In the power saving state 504, the network I/F 204 operates in an operation mode in which the input and output of data are restricted so that the network I/F 204 transmits a notification to the CPU 201 only when the network I/F 204 receives a specific data such as a job. The above processing for changing the operation mode from the operation mode restricting the input and output of data to the operation mode enabling the CPU 201 to control the communication via the network 113 without any restriction on the input and output of data is referred to as "opening the network I/F 204". Therefore, after updating the above changes, the CPU 201 starts communicating with the external apparatus in the stand-by state 502.

In addition, an update method instruction information (e.g., a rule book) in which the update method is linked with each of the above changes may be previously stored in the HDD 203 of the image processing controller 102, and the CPU 201 may determine the update method of the image forming apparatus information by acquiring the update method corresponding to the change from the update method instruction information.

<Operation Executed by an Image Forming Apparatus when a State of an Image Processing Controller Shifts to or Returns from the Power Saving State 504>

First, an operation executed by the image forming apparatus 103 when the state of the image processing controller 102 shifts to or returns from the power saving state 504 according to the present exemplary embodiment will be described with reference to FIG. 8.

Figure 8:
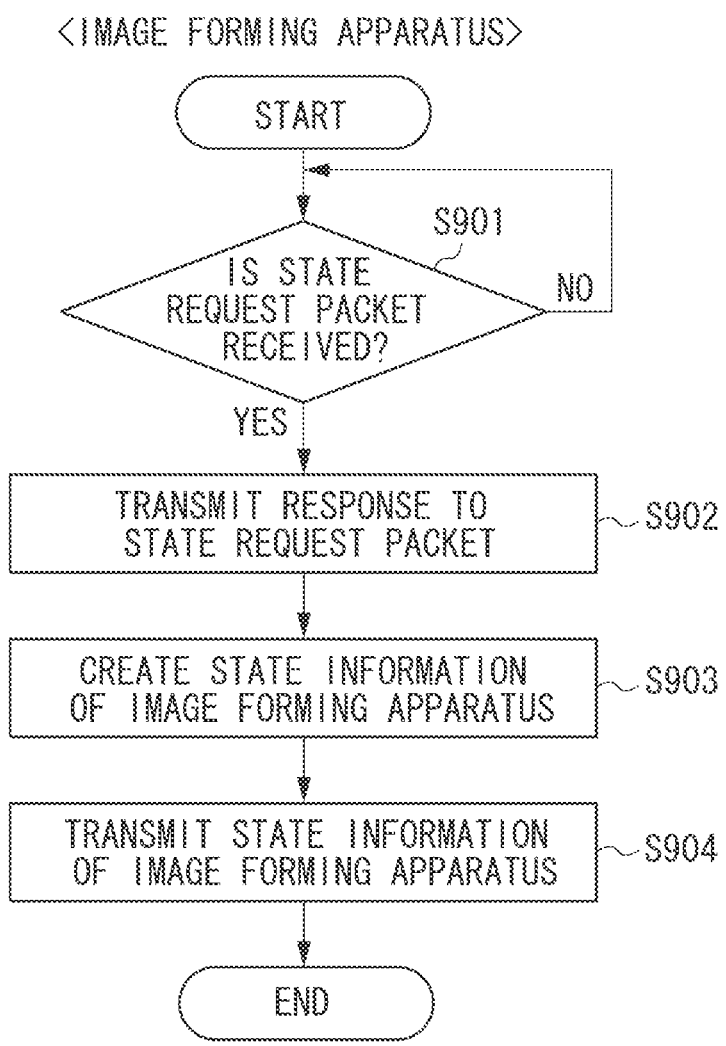
FIG. 8 is a flowchart illustrating an example of an operation executed by the image forming apparatus according to the first exemplary embodiment.

FIG. 8 is a flowchart illustrating an example of the operation executed by the image forming apparatus 103 when the state of the image processing controller 102 shifts to or returns from the power saving state 504 according to the present exemplary embodiment. The CPU 208 executes a program loaded on the memory 209 to realize the processing illustrated in the flowchart of FIG. 8.

First, in step S901, the CPU 208 monitors and determines whether a state request command to the image forming apparatus 103 transmitted from the image processing controller 102 is received. In a case where the CPU 208 determines that the state request command to the image forming apparatus 103 is not received (NO in step S901), the CPU 208 repeatedly executes the processing in step S901 until the state request command for the image forming apparatus 103 is received.

On the other hand, in a case where the CPU 208 determines that the state request command to the image forming apparatus 103 is received (YES in step S901), the processing proceeds to step S902. In step S902, the CPU 208 transmits a response (e.g., an ACK response in TCP) indicating that the image forming apparatus 103 has received the state request command, to the image processing controller 102.

Then, in step S903, the CPU 208 creates the state information data of the image forming apparatus 103. In step S903, the CPU 208 creates the state information data from various kinds of information of the image forming apparatus 103 stored in the memory 209 or the HDD 211. For example, the following pieces of information (1) to (5) may be stored in the memory 209 or the HDD 211 as the various kinds of information of the image forming apparatus 103, so that the state information data is created therefrom:

(1) A type of the finisher 110.
(2) A setting value of the finisher 110.
(3) Sheet feed stage information (sheet type, and sheet size).
(4) A remaining amount of sheets.
(5) A remaining amount of toner.
(6) A location (installation site).
(7) Sheet discharge information (e.g., sheets are fully-loaded, loaded, or not loaded on the output bin).

Next, in step S904, the CPU 208 transmits the state information data created in step S903 to the image processing controller 102 and ends the processing of the flowchart.

As described above, even in a case where the changes have occurred in the configuration of the image forming apparatus 103 while the image processing controller 102 is in the power saving state 504, the changes in the configuration of the image forming apparatus 103 are reflected in the image processing controller 102 when the state of the image processing controller 102 returns from the power saving state 504. Through the above-described processing, uniformity of the information across the entire image forming system can be ensured, and thus any malfunctions, which may otherwise be caused by a lack of the uniformity of the information when not employing one or more features of the present invention(s), can be prevented from occurring.

In the first exemplary embodiment, description has been given of the example in which the image forming apparatus information stored in the image processing controller 102 is updated, which is executed by the image processing controller 102 by acquiring the image forming apparatus information before shifting to and after returning from the power saving state 504. However, the present invention(s) are not limited to the above exemplary embodiment, and another exemplary embodiment may be also employed as long as uniformity of the information across the entire image forming system(s) can be ensured. Hereinafter, a second exemplary embodiment of the present invention(s) will be described below.

In the present exemplary embodiment, in a case where the state of the image processing controller 102 shifts to or returns from the power saving state 504, the image forming apparatus 103 stores the image forming apparatus information by itself. Then, when the state of the image processing controller 102 returns from the power saving state 504, the image forming apparatus 103 instructs the image processing controller 102 on the update method of the image forming apparatus information by comparing and analyzing the changes thereof.

Hereinafter, an operation executed by the image processing controller 102 when the state of the image processing controller 102 shifts to the power saving state 504 in the present exemplary embodiment will be described below with reference to FIG. 9.

Figure 9:
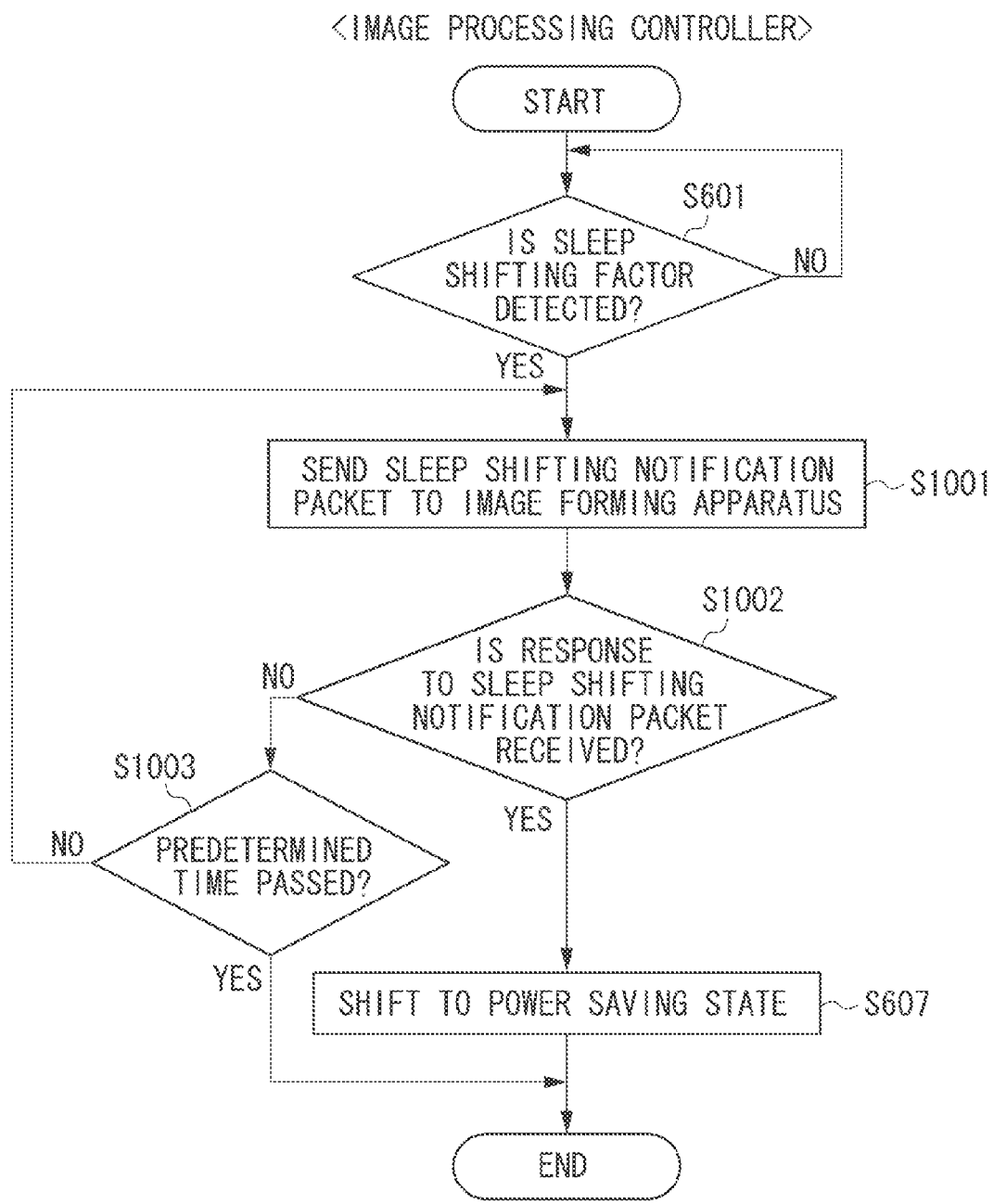
FIG. 9 is a flowchart illustrating an example of an operation executed by the image processing controller when the state of the image processing controller shifts to the power saving state according to a second exemplary embodiment.

FIG. 9 is a flowchart illustrating an example of an operation executed by the image processing controller 102 when the state of the image processing controller 102 shifts to the power saving state 504 in the present exemplary embodiment. The CPU 201 executes a program loaded on the memory 202 to realize the processing illustrated in the flowchart of FIG. 9. In addition, the same step numbers are applied to the same steps as those described in FIG. 5, and a detailed description thereof will be omitted.

In step S601, when the state of the image processing controller 102 shifts to the stand-by state 502 after executing a job, the CPU 201 monitors the occurrence of the sleep shifting factor. In a case where the CPU 201 determines that the sleep shifting factor is detected (YES in step S601), the processing proceeds to step S1001.

In step S1001, the CPU 201 transmits a sleep shifting notification packet to the image forming apparatus 103 via the network I/F 205. The sleep shifting notification packet is a packet for notifying the image forming apparatus 103 that the state of the image processing controller 102 shifts to the power saving state 504. The sleep shifting notification packet is transmitted to the image forming apparatus 103 via the control cable 111.

Next, in step S1002, the CPU 201 determines whether a response (e.g., an ACK response in TCP) indicating that the image forming apparatus 103 has received the sleep shifting notification packet transmitted in step S602 is received from the image forming apparatus 103. Then, in a case where the CPU 201 determines that the response indicating that the image forming apparatus 103 has received the sleep shifting notification packet is received (YES in step S1002), the processing proceeds to step S607. In step S607, the CPU 201 shifts the image processing controller 102 to the power saving state 504 from the stand-by state 502.

Further, in step S1002, in a case where the CPU 201 determines that the response indicating that the image forming apparatus 103 has received the sleep shifting notification packet is not received (NO in step S1002), the processing proceeds to step S1003. In step S1003, the CPU 201 determines whether a predetermined time has passed after transmitting the sleep shifting notification packet to the image forming apparatus 103. In a case where the CPU 201 determines that the predetermined time has not passed (NO in step S1003), the processing proceeds to step S1001. In step S1001, the CPU 201 transmits the sleep shifting notification packet to the image forming apparatus 103 via the network I/F 205 again. On the other hand, in a case where the CPU 201 determines that the predetermined time has passed (YES in step S1003), the CPU 201 ends the processing of the flowchart without shifting the image processing controller 102 to the power saving state 504.

<Operation Executed by an Image Processing Controller when a State of the Image Processing Controller Returns from a Power Saving State>

Next, an operation executed by the image processing controller 102 when the state of the image processing controller 102 returns to the stand-by state 502 from the power saving state 504 in the present exemplary embodiment will be described with reference to FIG. 10.

Figure 10:
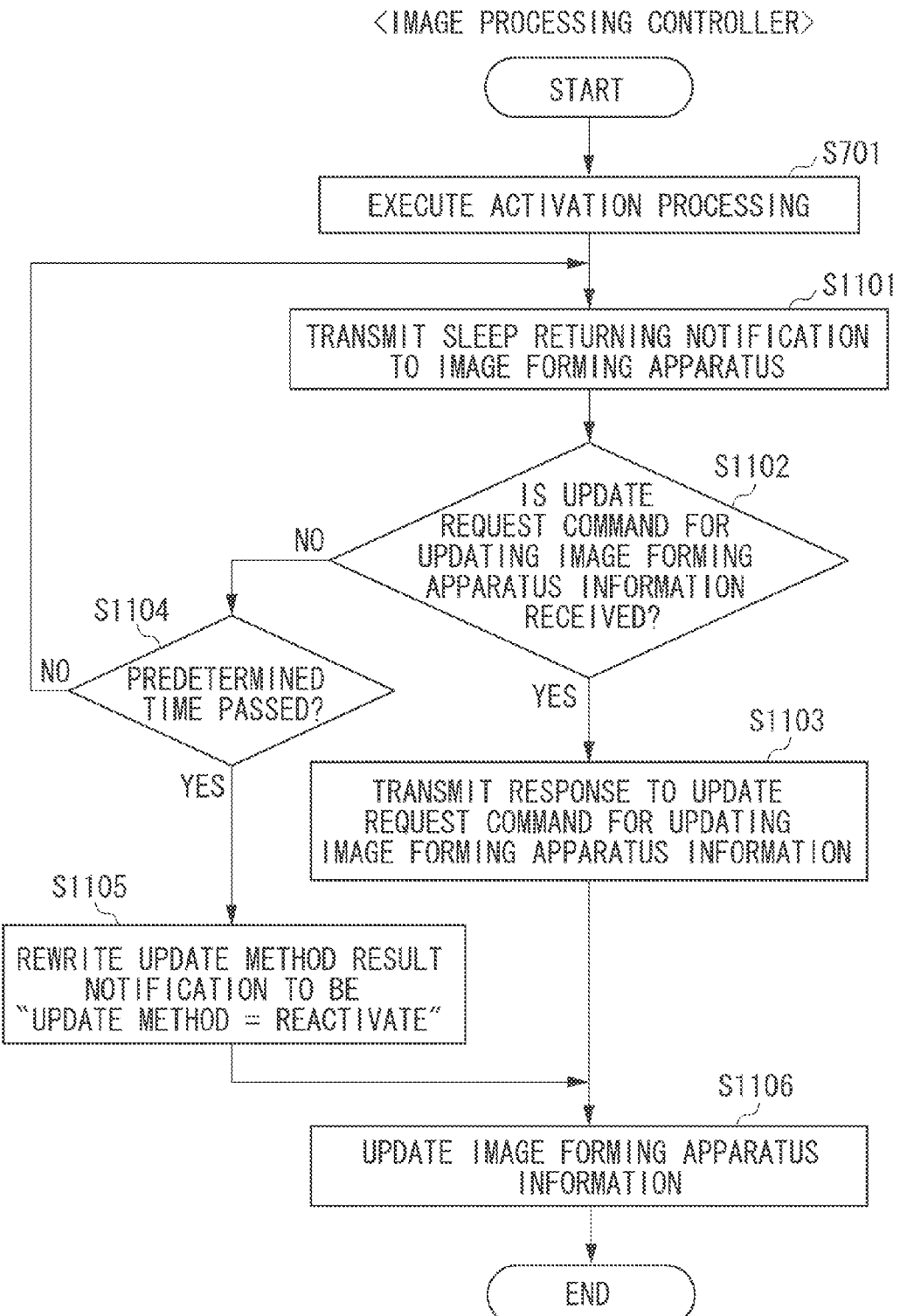
FIG. 10 is a flowchart illustrating an example of an operation executed by the image processing controller when the image processing controller returns from the power saving state according to the second exemplary embodiment.

FIG. 10 is a flowchart illustrating an example of the operation executed by the image processing controller 102 when the state of the image processing controller 102 returns from the power saving state 504 in the present exemplary embodiment. The CPU 201 executes the program loaded on the memory 202 to realize the processing illustrated in the flowchart of FIG. 10. In addition, the same step numbers are applied to the same steps as those described in FIG. 5, and a detailed description thereof will be omitted.

The CPU 201 executes the processing according to the flowchart illustrated in FIG. 10 when the returning factor has occurred and power is supplied thereto. In step S701, the CPU 201 executes the activation processing. Thereafter, in step S1101, the CPU 201 transmits a sleep returning notification packet to the image forming apparatus 103 via the network I/F 205. The sleep returning notification packet of the image processing controller 102 is a packet for notifying that the state of the image processing controller 102 returns from the power saving state 504.

Next, in step S1102, the CPU 201 determines whether an update request command (update instruction) for updating the image forming apparatus information stored in the image processing controller 102 is received from the image forming apparatus 103. Then, in a case where the CPU 201 determines that the update request command for updating the image forming apparatus information is received from the image forming apparatus 103 (YES in step S1102), the processing proceeds to step S1103. In step S1103, the CPU 201 transmits a response (receiving completion notification) indicating that the image processing controller 102 has received the above update request command for updating the image forming apparatus information to the image forming apparatus 103, and the processing proceeds to step S1106.

In step S1106, according to the update request command for updating the image forming apparatus information stored in the image processing controller 102 received in step S1102, the CPU 201 updates the image forming apparatus information stored in the image processing controller 102.

In step S1102, in a case where the CPU 201 determines that the update request command for updating the image forming apparatus information is not received from the image forming apparatus 103 (NO in step S1102), the processing proceeds to step S1104. In step S1104, the CPU 201 determines whether a predetermined time has passed after transmitting the sleeping returning notification to the image forming apparatus 103. In a case where the CPU 201 determines that the predetermined time has not passed (NO in step S1104), the processing proceeds to step S1101. In step S1101, the CPU 201 transmits the sleep returning notification to the image forming apparatus 103 via the network I/F 205 again. On the other hand, in a case where the CPU 201 determines that the predetermined time has passed (YES in step S1104), the processing proceeds to step S1105. In step S1105, the CPU 201 rewrites the content of an update method result notification to be "UPDATE METHOD=REBOOT" without receiving the update request command for updating the image forming apparatus information stored in the image processing controller 102, and the processing proceeds to step S1106.

<Operation Executed by an Image Forming Apparatus when a State of an Image Processing Controller Shifts to a Power Saving State>

Hereinafter, an operation executed by the image forming apparatus 103 when the state of the image processing controller 102 shifts to the power saving state 504 in the present exemplary embodiment will be described with reference to FIG. 11.

Figure 11:
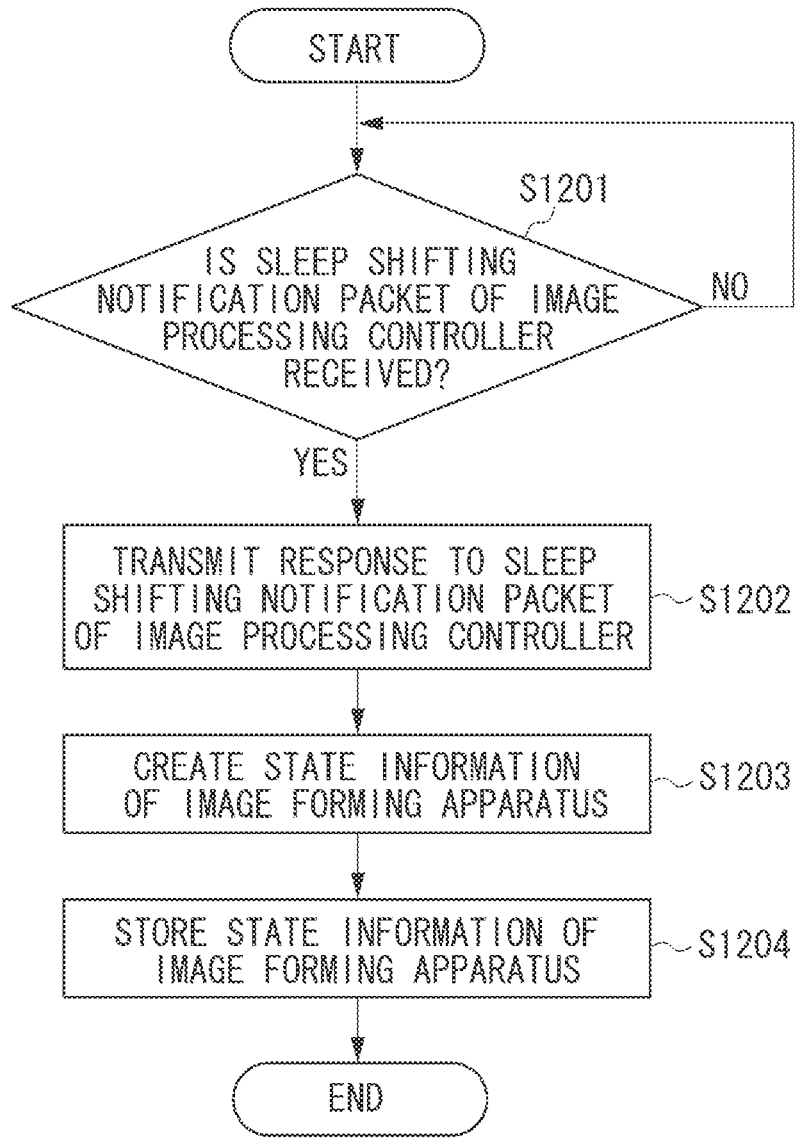
FIG. 11 is a flowchart illustrating an example of an operation executed by the image forming apparatus when the state of the image processing controller shifts to the power saving state according to the second exemplary embodiment.

FIG. 11 is a flowchart illustrating an example of an operation executed by the image forming apparatus 103 when the state of the image processing controller 102 shifts to the power saving state 504 in the present exemplary embodiment. The CPU 208 executes a program loaded on the memory 209 to realize the processing illustrated in the flowchart of FIG. 11.

First, in step S1201, the CPU 208 monitors and determines whether a sleep shifting notification packet transmitted from the image processing controller 102 is received. In a case where the CPU 208 determines that the sleep shifting notification packet is not received from the image processing controller 102 (NO in step S1201), the CPU 208 repeatedly executes the processing in step S1201 until the sleep shifting notification packet is received.

On the other hand, in a case where the CPU 208 determines that the sleep shifting notification packet is received from the image processing controller 102 (YES in step S1201), the processing proceeds to step S1202. In step S1202, the CPU 208 transmits a response (e.g., an ACK response in TCP) indicating that the image forming apparatus 103 has received the sleep shifting notification packet to the image processing controller 102.

Next, in step S1203, the CPU 208 creates the state information data of the image forming apparatus 103 from the various kinds of information of the image forming apparatus 103 stored in the memory 209 or the HDD 211. The processing in step S1203 is the same as that of step S903 in FIG. 8, and thus a detailed description thereof will be omitted.

Next, in step S1204, the CPU 208 stores the created state information data in the HDD 211 and ends the processing of the flowchart.

<Operation Executed by an Image Forming Apparatus when a State of an Image Processing Controller Returns from a Power Saving State>

An operation executed by the image forming apparatus 103 when the state of the image processing controller 102 returns from the power saving state 504 in the present exemplary embodiment will be described with reference to FIG. 12.

Figure 12:
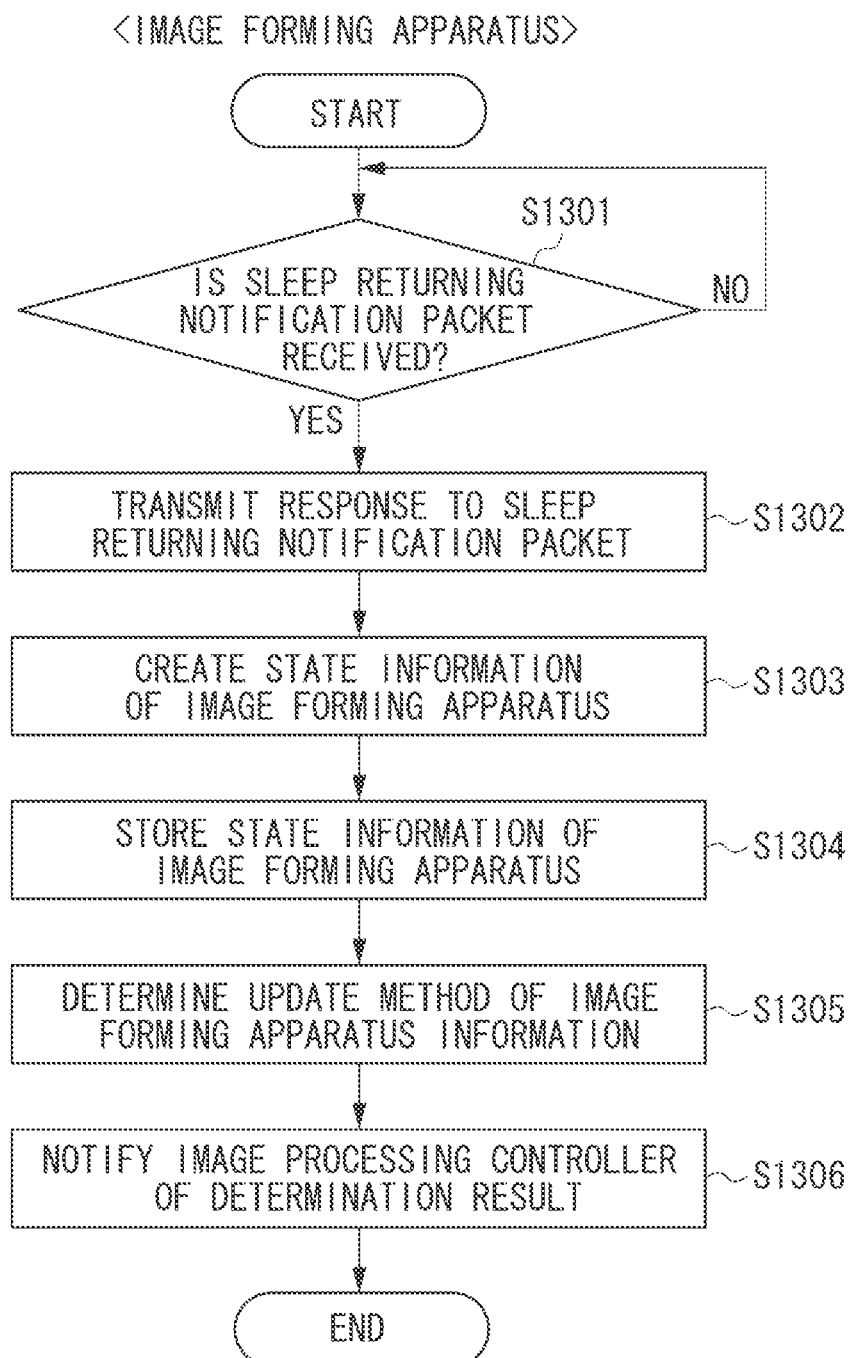
FIG. 12 is a flowchart illustrating an example of an operation executed by the image forming apparatus when the image processing controller returns from the power saving state according to the second exemplary embodiment.

FIG. 12 is a flowchart illustrating the operation executed by the image forming apparatus 103 when the state of the image processing controller 102 returns from the power saving state 504 in the present exemplary embodiment. The CPU 208 executes a program loaded on the memory 209 to realize the processing illustrated in the flowchart of FIG. 12.

First, in step S1301, the CPU 208 monitors and determines whether a sleep returning notification packet transmitted from the image processing controller 102 is received. In a case where the CPU 208 determines that the sleep returning notification packet is not received (NO in step S1301), the CPU 208 repeatedly executes the processing of step S1301 until the sleep returning notification packet is received.

On the other hand, in a case where the CPU 208 determines that the sleep returning notification packet is received (YES in step S1301), the processing proceeds to step S1302. In step S1302, the CPU 208 transmits a response (e.g., an ACK response in TCP) indicating that the image forming apparatus 103 has received the sleep returning notification packet to the image processing controller 102.

Next, in step S1303, the CPU 208 creates the state information data of the image forming apparatus 103 from the various kinds of information of the image forming apparatus 103 stored in the memory 209 or the HDD 211. The processing in step S1303 is the same as that of step S903 in FIG. 8, and thus a detailed description thereof will be omitted. In step S1304, the CPU 208 stores the state information data created in step S1303 in the HDD 211.

Next, in step S1305, the CPU 208 determines an update method of the image forming apparatus information stored in the image processing controller 102 by using the state information data of the image forming apparatus 103 which is created when the state of the image processing controller 102 shifts to or returns from the power saving state 504. The processing executed in step S1305 will be described below in detail with reference to FIG. 13.

Further, in step S1306, the CPU 208 notifies a result of determination processing executed in step S1305 (i.e., an update method of the image forming apparatus information stored in the image processing controller 102) to the image processing controller 102 as an update request command (update instruction). Thereafter, the CPU 208 ends the processing of the flowchart.

<Operation for Determining an Update Method of Image Forming Apparatus Information Stored in an Image Processing Controller>

Hereinafter, an operation for determining the update method of the image forming apparatus information stored in the image processing controller 102 (e.g., processing executed in step S1305 of FIG. 12) according to the present exemplary embodiment will be described with reference to FIG. 13.

Figure 13:
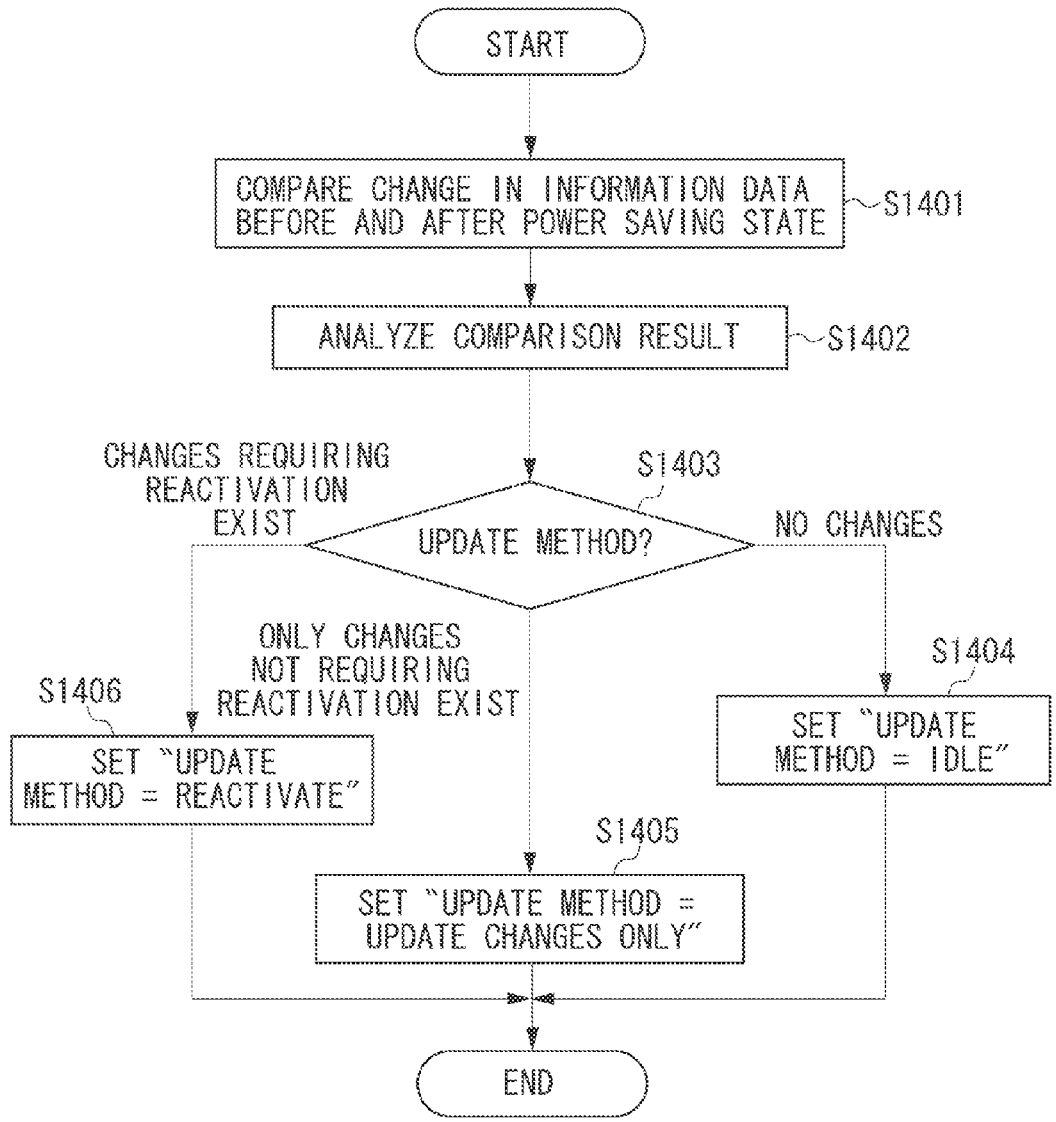
FIG. 13 is a flowchart illustrating an example of a determination operation of an update method of the image forming apparatus information stored in the image processing controller, executed by the image forming apparatus according to the second exemplary embodiment.

FIG. 13 is a flowchart illustrating an example of the operation for determining the update method of the image forming apparatus information stored in the image processing controller 102 executed by the image forming apparatus 103 according to the present exemplary embodiment. The CPU 208 executes a program loaded on the memory 209 to realize the processing illustrated in the flowchart of FIG. 13.

In step S1401, the CPU 208 compares the pieces of state information data of the image forming apparatus 103 created respectively when the state of the image processing controller 102 shifts to the power saving state 504 and returns to the stand-by state 502. The state information data of the image forming apparatus 103 created when the state of the image processing controller 102 shifts to the power saving state 504, is the state information data created in step S1203 and stored in step S1204 in FIG. 11. Further, the state information data of the image forming apparatus 103 created when the state of the image processing controller 102 shifts to the stand-by state 502 is the state information data created in step S1303 and stored in step S1304 in FIG. 12.

Next, in step S1402, the CPU 208 extracts only differences (changes) from a comparison result acquired in step S1401 to analyze the comparison result of the extracted changes. Then, in step S1403, based on the analysis result acquired in step S1402, the CPU 208 determines the update method of the changes.

In step S1403, in a case where the CPU 201 determines that the changes do not exist (NO in step S1403), the processing proceeds to step S1404. In step S1404, the CPU 208 sets a result as "UPDATE METHOD=IDLE" and ends the processing of the flowchart.

In a case where the CPU 208 determines that no changes requiring the reactivation/rebooting processing exist ("ONLY CHANGES NOT REQUIRING REACTIVATION EXIST" in step S1403), the processing proceeds to step S1405. In step S1405, the CPU 208 sets a result as "UPDATE METHOD=UPDATE CHANGES ONLY". In this case, the state information data of the image forming apparatus 103 corresponding to the changes is also set to the parameter of the update request command. Then, the CPU 208 ends the processing of the flowchart. In addition, specific examples of "ONLY CHANGES NOT REQUIRING REACTIVATION" have already been described in the first exemplary embodiment.

In a case where the CPU 208 determines that the changes requiring the reactivation/rebooting processing exist ("CHANGES REQUIRING REACTIVATION EXIST" in step S1403), the processing proceeds to step S1406. In step S1406, the CPU 208 sets a result as "UPDATE METHOD=REBOOT" and ends the processing of the flowchart. In addition, specific examples of "CHANGES REQUIRING REACTIVATION" have already been described in the first exemplary embodiment.

In addition, an update method instruction information (e.g., a rule book) in which the update method is linked with each of the above changes may be previously stored in the HDD 211 of the image forming apparatus 103, and the CPU 208 may determine the update method of the image forming apparatus information by acquiring the update method corresponding to the change from the update method instruction information.

As described above, in step S1306 of FIG. 12, the update method determined in any of steps S1404, S1405, and S1406 in FIG. 13 is notified to the image processing controller 102 as the update request command of the image forming apparatus information. Based on this update request command of the image forming apparatus information, in step S1106 of FIG. 10, the image processing controller 102 updates the image forming apparatus information stored therein.

For example, when the update request command corresponds to "UPDATE METHOD=IDLE", the CPU 201 of the image processing controller 102 simply returns the image processing controller 102 to the stand-by state 502 without updating the image forming apparatus information stored in the image processing controller 102. Further, when the update request command corresponds to "UPDATE METHOD=UPDATE CHANGES ONLY", the CPU 201 of the image processing controller 102 individually updates the information according to the changes. Further, when the update request command corresponds to "UPDATE METHOD=REBOOT", the CPU 201 of the image processing controller 102 resets all of the information of the image processing controller 102 by reactivating the entire image processing controller 102.

According to the present exemplary embodiment, even in a case where the changes have occurred in the configuration of the image forming apparatus 103 while the image processing controller 102 is in the power saving state 504, the image forming apparatus 103 compares and analyzes the changes in the configuration by itself, and reflects the changes in the image processing controller 102 when the state of the image processing controller 102 returns from the power saving state 504. Through the above-described processing, uniformity of the information across the entire image forming system can be ensured, and thus any malfunctions, which may otherwise be caused by a lack of the uniformity of the information (e.g., across an entire image forming system) when not employing one or more features of the present invention(s), can be avoided and/or prevented from occurring.

In the first exemplary embodiment, the operation for updating the image forming apparatus information stored in the image processing controller 102 that is executed by the image processing controller 102 by comparing the pieces of the information of the image forming apparatus 103 acquired at the time of shifting to and returning from the power saving state 504, has been described as an example.

However, the present invention(s) are not limited to the above-described exemplary embodiment. The printing jobs and accesses to the image processing controller 102 received when shifting to the stand-by state 502, in a case where the changes require the reactivation/rebooting processing exist, may be processed prior to the update processing of the changes in a case where the printing job or the access is not affected by the changes in the information processing apparatus information. Such an exemplary embodiment will be described below.

Hereinafter, referring to FIG. 14, description will be given for an operation executed by the image processing controller 102 in a case where the changes in the image forming apparatus information require the reactivation/rebooting processing when the state of the image processing controller 102 returns to the stand-by state 502 from the power saving state 504.

FIG. 14 (including FIGS. 14A and 14B) is a flowchart illustrating an example of the processing for updating the image forming apparatus information stored in the image processing controller 102, (e.g., processing executed in step S707 in FIG. 6) executed when the state of the image processing controller 102 returns from the power saving state 504 in a third exemplary embodiment. The CPU 201 executes a program loaded on the memory 202 to realize the processing illustrated in the flowchart of FIG. 14. In addition, the same step numbers are applied to the same steps as those described in FIG. 7, and a detailed description thereof will be omitted.

In step S804, in a case where the CPU 201 determines that the changes requiring the reactivation/rebooting processing exist ("CHANGES REQUIRING REACTIVATION EXIST" in step S804), the processing proceeds to step S1501.

In step S1501, the CPU 201 determines whether an access corresponding to a returning factor of the image processing controller 102 or an access received thereby after returning to the stand-by state 502 exists.

In a case where the CPU 201 determines that neither of the access corresponding to the returning factor of the image processing controller 102 nor the access received thereby after returning to the stand-by state 502 (nor any other access to the image processing controller 102) exist (NO in step S1501), the processing proceeds to step S807. In step S807, the CPU 201 reboots the entire image processing controller 102 and resets all of the information of the image processing controller 102. Specifically, the following pieces of information (1) and (2) are included in the information to be reset and changed:

(1) A type of the finisher 110.
(2) A setting value of the finisher 110.

On the other hand, in a case where the CPU 201 determines that the access corresponding to the returning factor of the image processing controller 102 or the access received thereby after returning to the stand-by state 502 (or any other access to the image processing controller 102) exists (YES in step S1501), the processing proceeds to step S1502.

In step S1502 (see FIG. 14B portion of FIG. 14), the CPU 201 analyzes the job content of the above-described access received thereby. Then, in step S1503, the CPU 201 determines whether the job processing corresponding to the received and/or existing access is affected by the reactivation/rebooting processing of the image processing controller 102.

In addition, the following jobs (1) and (2) are included in the job processing corresponding to the accesses that are not affected by the reactivation/rebooting processing of the image processing controller 102:

(1) A printing job including only the settings that are not affected by the reactivation/rebooting processing.
(2) A notification job only extracting and notifying the information that are not affected by the reactivation/rebooting processing.

Further, the following printing jobs (I) and (II) are included in (1) "A printing job including only the settings that are not affected by the reactivation/rebooting processing":
(I) A printing job without using the finisher 110.
(II) A printing job that is to be stored in the HDD 211 of the image forming apparatus 103.

Further, the following printing jobs (III) and (IV) are included in (2) "A notification job only extracting and notifying the information not affected by the reactivation/rebooting processing":
(III) A notification job for acquiring the sheet type information stored in the image forming apparatus 103.
(IV) A notification job for acquiring the name of the image forming apparatus 103.

Then, in a case where the CPU 201 determines that the job processing corresponding to the received and/or existing access is not affected by the reactivation/rebooting processing of the image processing controller 102 (NO in step S1503), the processing proceeds to step S1504. In step S1504, the CPU 201 firstly processes the job corresponding to the received and/or existing access, waits until the processing of the job corresponding to the received and/or existing access is completed, and the processing proceeds to step S807 (see FIG. 14A portion of FIG. 14). In step S807, the CPU 201 reboots the image processing controller 102.

On the other hand, in a case where the CPU 201 determines that the processing of the job corresponding to the received and/or existing access is affected by the reactivation/rebooting processing of the image processing controller 102 (YES in step S1503 shown in FIG. 14B portion of FIG. 14), the processing proceeds to step S1505. In step S1505, the CPU 201 cancels the job corresponding to the received and/or existing access, and advances the processing to step S807 (see FIG. 14A portion of FIG. 14). In step S807, the CPU 201 reboots the image processing controller 102.

According to the present exemplary embodiment, in a case where the changes requiring the reactivation/rebooting processing of the image processing controller 102 occur in the configuration of the image forming apparatus 103 while the image processing controller 102 is in the power saving state, the image processing controller 102 firstly executes the processing of the received job if the job is not affected by the reactivation/rebooting processing for resetting the information. With this processing, the job can be processed promptly while any malfunctions, which may otherwise be caused by a lack of uniformity of the information (e.g., across an entire image forming system when not employing one or more features of the present invention(s), can be avoided and/or prevented from occurring.

In the first exemplary embodiment, the operation for updating the image forming apparatus information stored in the image processing controller 102 executed by the image processing controller 102 by comparing the pieces of the information of the image forming apparatus 103 acquired at the time of shifting to and returning from the power saving state 504, has been described as an example.

However, the present invention(s) are not limited to the above-described exemplary embodiment. The printing jobs and accesses to the image processing controller 102 received when shifting to the stand-by state 502, in a case where the changes require the reactivation/rebooting processing exist, may be processed prior to the update processing of the changes in a case where the printing job or the access is not affected by the changes in the information processing apparatus information. Such an exemplary embodiment will be described below.

Hereinafter, referring to FIG. 15, description will be given of an operation for updating only the changes (e.g., processing executed in step S808 in FIG. 7) executed by the image processing controller 102 in a case where the changes in the image forming apparatus information do not require the reactivation/rebooting processing when the state of the image processing controller 102 returns to the stand-by state 502 from the power saving state 504.

FIG. 15 is a flowchart illustrating an example of the operation for updating only the changes (e.g., processing executed in step S808 in FIG. 7) executed by the image processing controller 102 according to a fourth exemplary embodiment, in a case where the changes in the image forming apparatus information do not require the reactivation/rebooting processing when the state of the image processing controller 102 returns from the power saving state 504. The CPU 201 executes a program loaded on the memory 202 to realize the processing illustrated in the flowchart of FIG. 15.

First, in step S1601, the CPU 201 determines whether the image processing controller 102 receives an access, is accessed or that such an access exists, while the changes in the image forming apparatus information stored in the image processing controller 102 are being updated.

Then, in a case where the CPU 201 determines that the image processing controller 102 does not receive the access while the changes in the image forming apparatus information are being updated (or is not accessed or that such an access does not exist) (NO in step S1601), the processing proceeds to step S1602. In step S1602, the CPU 201 executes the update processing by extracting one unprocessed change from among the changes in the image forming apparatus information.

Next, in step S1603, the CPU 201 checks the existence of unprocessed changes in the image forming apparatus information. Then, in step S1604, the CPU 201 determines whether the unprocessed changes still exist. In a case where the CPU 201 determines that the unprocessed changes still exist (YES in step S1604), the processing proceeds to step S1601. On the other hand, in a case where the CPU 201 determines that the unprocessed changes do not exist (NO in step S1604), the CPU 201 ends the processing of the flowchart.

Further, in step S1601, in a case where the CPU 201 determines that the image processing controller 102 receives the access, is accessed or that such an access exists, while the changes in the image forming apparatus information stored therein are being updated (YES in step S1601), the processing proceeds to step S1605.

In step S1605, the CPU 201 analyzes the job content of the received access and/or of the existing access. Then, in step S1606, the CPU 201 determines whether processing of the job corresponding to the received access and/or of the existing access is affected by the update processing of the changes in the image forming apparatus information.

In addition, the following processing (1) and (2) are included in the job processing corresponding to the accesses affected by the update processing of the changes in the image forming apparatus information:
(1) Processing of a printing job including the settings affected by the update processing of the changes in the image forming apparatus information.
(2) Processing of a notification job for acquiring the information affected by the update processing of the changes in the image forming apparatus information.

Then, in a case where the CPU 201 determines that the processing of the job corresponding to the received and/or existing access is affected by the update processing of the changes in the image forming apparatus information (YES in step S1606), the CPU 201 advances the processing to step S1602 in order to firstly update the changes in the image forming apparatus information.

On the other hand, in a case where the CPU 201 determines that the processing of the job corresponding to the received and/or existing access is not affected by the update processing of the changes in the image forming apparatus information (NO in step S1606), the processing proceeds to step S1607. In step S1607, the CPU 201 firstly processes the job corresponding to the received and/or existing access. Then, after the processing of the job corresponding to the received and/or existing access has been completed, the CPU 201 advances the processing to step S1602 to update the changes in the image forming apparatus information.

According to the present exemplary embodiment, in a case where the changes not requiring the reactivation/rebooting processing of the image processing controller 102 occurs in the configuration of the image forming apparatus 103 while the image processing controller 102 is in the power saving state, the image processing controller 102 firstly executes the processing of a received job if that job is not affected by the update processing of the changes. With this processing, the job can be processed promptly while any malfunctions, which may otherwise be caused by a lack of uniformity of the information (e.g., across an entire image forming system) when not employing one or more features of the present invention(s), can be avoided and/or prevented from occurring.

<Effects of Embodiments>

According to the exemplary embodiments of the present invention(s), the image processing controller 102 stores the state information of the image forming apparatus 103 before shifting to the power saving state 504. Then, the state information of the image forming apparatus 103 when the state of the image processing controller 102 returned from the stand-by state 502 is compared with the state information of the image forming apparatus 103 acquired when the state of the image processing controller 102 shifts to the power saving state 504 and returns from the power saving state 504. Then, the differences (changes) in the state information are reflected in the information of the image forming apparatus 103 stored in the image processing controller 102 as appropriate by employing the update method according to the changes. Through the above-described processing, uniformity of the information across the entire image forming system can be ensured, and thus any malfunctions, which may otherwise be caused by a lack of the uniformity of the information (e.g., across an entire image forming system) when not employing one or more features of the present invention(s), can be avoided and/or prevented from occurring.

Further, configurations and content of the above-described various types of data are not limited thereto, and thus the configurations and the content thereof may be configured in various ways according to the use or the purpose thereof.

While the exemplary embodiments of the present invention(s) have been described in detail, it is to be understood that the present invention(s) also can be realized as, for example, a system, an apparatus, a method, a program, or a storage medium. Specifically, the present invention(s) may be applied to a system configured of a plurality of devices, or may be applied to an apparatus configured of a single device. The present invention(s) may additionally or alternatively be directed to method(s) of using such system(s) and/or apparatus(es), and to storage medium(s) having a program stored thereon for causing a computer or processor to perform such method(s).

Furthermore, any configuration in which the above-described exemplary embodiments are combined with each other may be included in the present invention(s).

<Other Embodiments>

Further, the present invention(s) can be realized by executing the following processing. More specifically, software (a program) for realizing a function of the above-described exemplary embodiments is supplied to at least one system or at least one apparatus via a network or various storage media, so that a computer (or a CPU or a micro processing unit (MPU)) of the system or the apparatus reads and executes the program.

Furthermore, the present invention(s) may be applied to at least one system configured of a plurality of devices, or may be applied to at least one apparatus configured of a single device.

The present invention(s) are not limited to the above-described exemplary embodiments. Thus, various modifications and changes (including an organic combination of the exemplary embodiments) are possible based on a gist of the invention(s), and such modifications and changes are not excluded from the scope of the present invention(s). Therefore, any configuration in which the above-described exemplary embodiments and variations thereof are combined with each other is also included in the present invention(s).

According to at least one aspect of the present invention(s), uniformity of the information across the entire image forming system(s) can be ensured even in a case where the changes have occurred in the configuration of the image forming apparatus while the image processing controller is in the power saving state, and thus any malfunctions, which may otherwise be caused by a lack of the uniformity when not employing one or more features of the present invention(s), can be avoided and/or prevented from occurring.

Embodiments of the present invention(s) can also be realized by a computer of a system or apparatus that reads out and executes computer executable instructions recorded on a storage medium (e.g., non-transitory computer-readable storage medium) to perform the functions of one or more of the above-described embodiment(s) of the present invention(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer and/or processor, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention(s) have been described with reference to exemplary embodiments, it is to be understood that the invention(s) are not limited to the disclosed exemplary embodiments. The scope of the following claims is to be accorded the broadest interpretation so as to encompass all such modifications and equivalent structures and functions.

This application claims the benefit of Japanese Patent Application No. 2013-246933 filed Nov. 29, 2013, which is hereby incorporated by reference herein in its entirety.

What is claimed is:

1. An image forming system comprising:
an image processing apparatus configured to generate and transmit image data based on a printing request by receiving the printing request from an information processing apparatus; and
an image forming apparatus configured to execute printing based on the image data transmitted from the image processing apparatus,
wherein the image processing apparatus includes
a storage unit configured to store status information of the image forming apparatus,
a return unit configured to return a state of the image processing apparatus from a power saving state in which at least power is supplied to a first communication unit for receiving data transmitted from the information processing apparatus in a case where the image processing apparatus detects a predetermined condition, and
a request unit configured to transmit a request for acquiring the status information of the image forming apparatus to the image forming apparatus in a case where the return unit returns the image processing apparatus from the power saving state,
wherein the image forming apparatus includes a transmission unit configured to transmit the status information of the image forming apparatus to the image processing apparatus based on the request transmitted by the request unit, and
wherein the image processing apparatus further includes an update unit configured to, in response to the image processing apparatus detecting a change or changes in the status information of the image forming apparatus, update the status information stored in the storage unit by using the status information of the image forming apparatus transmitted by the transmission unit.

2. The image forming system according to claim 1, wherein the request unit transmits a request for acquiring the status information of the image forming apparatus to the image forming apparatus when the return unit returns the state of the image processing apparatus from the power saving state.

3. The image forming system according to claim 1, wherein the predetermined condition is a condition that the first communication unit receives data from the information processing apparatus.

4. The image forming system according to claim 1, wherein the image processing apparatus further includes a second communication unit configured to receive data transmitted from the image forming apparatus, and wherein the predetermined condition is a condition that the second communication unit receives data from the image forming apparatus.

5. The image forming system according to claim 1, wherein the image processing apparatus transmits the image data to the image forming apparatus via a video cable, and transmits a control command for controlling the image data to the image forming apparatus via a control cable.

6. The image forming system according to claim 1, wherein the storage unit is further configured to store configuration information of the image forming apparatus, wherein the request unit is further configured to transmit a request for acquiring the configuration information of the image forming apparatus to the image forming apparatus in a case where the return unit returns the image processing apparatus from the power saving state, wherein the transmission unit is further configured to transmit the configuration information of the image forming apparatus to the image processing apparatus based on the request transmitted by the request unit, wherein the update unit is further configured to update the configuration information stored in the storage unit by using the configuration information of the image forming apparatus transmitted by the transmission unit, and wherein the configuration information includes at least any one of information of a connection apparatus connected to the image forming apparatus, information of a sheet feed stage, information of a sheet, and information of toner.

7. The image forming system according to claim 1, wherein the image processing apparatus further includes a determination unit configured to determine whether reactivation or rebooting is required in connection with update processing executed by the update unit, and a control unit configured to reactivate or reboot the image processing apparatus in a case where the determination unit determines that reactivation or rebooting is required.

8. The image forming system according to claim 7, wherein the determination unit determines that the image processing apparatus has to be reactivated or rebooted in a case where a type of a post-processing unit for executing post-processing of a sheet on which an image is formed by the image forming apparatus is to be changed, or a change in a setting value of the post-processing unit is to be updated.

9. The image forming system according to claim 1, wherein the image forming system is communicably connected to the information processing apparatus, the information processing apparatus being located externally with respect to the image forming system.

10. The image forming system according to claim 1, wherein: (i) the information processing apparatus, the image processing apparatus and the image forming apparatus are different, independent apparatuses; (ii) the information processing apparatus is connected to the image processing apparatus via a network and/or is connected to the image forming apparatus via at least one of a network, one or more cables and the image processing apparatus; and (iii) the image processing apparatus is communicably connected to the image forming apparatus via a video cable and a control cable.

11. An image forming system comprising:
an image processing apparatus configured to generate and transmit image data based on a printing request by receiving the printing request from an information processing apparatus; and
an image forming apparatus configured to execute printing based on the image data transmitted from the image processing apparatus,
wherein the image processing apparatus includes
a storage unit configured to store status information of the image forming apparatus,
a return unit configured to return a state of the image processing apparatus from a power saving state in which at least power is supplied to a first communication unit for receiving data transmitted from the information processing apparatus in a case where the image processing apparatus detects a predetermined condition, and
a notification unit configured to notify the image forming apparatus that the state of the image processing apparatus has returned from the power saving state in a case where the return unit returns the image processing apparatus from the power saving state,
wherein the image forming apparatus includes a transmission unit configured to transmit the status information of the image forming apparatus to the image processing apparatus based on the notification from the notification unit, and
wherein the image processing apparatus further includes an update unit configured to, in response to the image processing apparatus detecting a change or changes in the status information of the image forming apparatus, update the status information stored in the storage unit by using the status information of the image forming apparatus transmitted by the transmission unit.

12. The image forming system according to claim 11, wherein the notification unit notifies the image forming apparatus that the state of the image processing apparatus has returned from the power saving state when the return unit returns the image processing apparatus from the power saving state.

13. The image forming system according to claim 11, wherein the predetermined condition is a condition that the first communication unit receives data from the information processing apparatus.

14. The image forming system according to claim 11, wherein the image processing apparatus further includes a second communication unit configured to receive data transmitted from the image forming apparatus, and wherein the predetermined condition is a condition that the second communication unit receives data from the image forming apparatus.

15. The image forming system according to claim 11, wherein the image processing apparatus transmits the image data to the image forming apparatus via a video cable, and transmits a control command for controlling the image data to the image forming apparatus via a control cable.

16. The image forming system according to claim 11, wherein the storage unit is further configured to store configuration information of the image forming apparatus, wherein the transmission unit is further configured to transmit the configuration information of the image forming apparatus to the image processing apparatus based on the notification from the notification unit, wherein the update unit is further configured to update the configuration information stored in the storage unit by using the configuration information of the image forming apparatus transmitted by the transmission unit, and wherein the configuration information includes at least any one of information of a connection apparatus connected to the image forming apparatus, information of a sheet feed stage, information of a sheet, and information of toner.

17. The image forming system according to claim 11, wherein the image processing apparatus further includes a determination unit configured to determine whether reactivation or rebooting is required in connection with update processing executed by the update unit, and a control unit configured to reactivate or reboot the image processing apparatus in a case where the determination unit determines that reactivation or rebooting is required.

18. The image forming system according to claim 17, wherein the determination unit determines that the image processing apparatus has to be reactivated or rebooted in a case where a type of a post-processing unit for executing post-processing of a sheet on which an image is formed by the image forming apparatus is changed, or a change in a setting value of the post-processing unit is updated.

19. The image forming system according to claim 11, wherein the image forming system is communicably connected to the information processing apparatus, the information processing apparatus being located externally with respect to the image forming system.

20. The image forming system according to claim 11, wherein: (i) the information processing apparatus, the image processing apparatus and the image forming apparatus are different, independent apparatuses; (ii) the information processing apparatus is connected to the image processing apparatus via a network and/or is connected to the image forming apparatus via at least one of a network, one or more cables and the image processing apparatus; and (iii) the image processing apparatus is communicably connected to the image forming apparatus via a video cable and a control cable.

* * * * *